United States Patent
Asao et al.

(10) Patent No.: US 9,586,615 B2
(45) Date of Patent: Mar. 7, 2017

(54) ELECTRIC POWER STEERING APPARATUS

(75) Inventors: Yoshihito Asao, Tokyo (JP); Akihiko Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 193 days.

(21) Appl. No.: 14/353,435

(22) PCT Filed: Jul. 5, 2012

(86) PCT No.: PCT/JP2012/067190
§ 371 (c)(1),
(2), (4) Date: Apr. 22, 2014

(87) PCT Pub. No.: WO2013/111365
PCT Pub. Date: Aug. 1, 2013

(65) Prior Publication Data
US 2014/0326530 A1 Nov. 6, 2014

(30) Foreign Application Priority Data

Jan. 25, 2012 (JP) .................................. 2012-012577
Jan. 25, 2012 (JP) .................................. 2012-012578

(51) Int. Cl.
*H02K 1/32* (2006.01)
*B62D 5/04* (2006.01)
*H02K 9/22* (2006.01)

(52) U.S. Cl.
CPC ......... *B62D 5/0403* (2013.01); *B62D 5/0406* (2013.01); *H02K 9/22* (2013.01); *H02K 11/33* (2016.01); *H02K 2209/00* (2013.01)

(58) Field of Classification Search
CPC ....... H02K 11/33; H02K 9/22; H02K 2209/00
(Continued)

(56) References Cited

U.S. PATENT DOCUMENTS 6,081,056 A 6/2000 Takagi et al.
6,304,448 B1 10/2001 Fukada et al.
(Continued)

FOREIGN PATENT DOCUMENTS

CN 1190500 A 8/1998
EP 26346066 A1 9/2013
(Continued)

OTHER PUBLICATIONS

Communication dated Sep. 29, 2015 from the State Intellectual Property Office of the P.R.C. in counterpart application No. 201280058725.5.
(Continued)

*Primary Examiner* — Hanh Nguyen
(74) *Attorney, Agent, or Firm* — Sughrue Mion, PLLC; Richard C. Turner

(57) ABSTRACT

An electric power steering apparatus (1) is provided with a heat sink (5) and an intermediate member (4) whose surface portions are perpendicularly placed with respect to an axial direction of a motor's shaft center, and arranged in such a way that each of power modules (51a, 51b) of a plurality of driving circuits is attached on a surface portion of the heat sink (5) so that an extending direction of a maximum outer dimension of the power modules (51a, 51b) is perpendicular to the axial direction, and each of electric devices (C1a-C1b) of the plurality of driving circuits is attached on a surface portion of the intermediate member (4) so that an extending direction of a maximum outer dimension of the electric devices (C1a-C1b) is perpendicular to the axial direction.

16 Claims, 10 Drawing Sheets

(58) Field of Classification Search
USPC .......................................... 310/52, 54, 58, 64
See application file for complete search history.

(56) References Cited

U.S. PATENT DOCUMENTS

| | | | | |
|---|---|---|---|---|
| 6,577,030 | B2* | 6/2003 | Tominaga | B62D 5/0406 310/64 |
| 9,123,693 | B2* | 9/2015 | Tanaka | B62D 5/0406 |
| 2006/0158049 | A1* | 7/2006 | Suzuki | H02K 11/33 310/52 |
| 2010/0288577 | A1 | 11/2010 | Sonoda et al. | |
| 2011/0018374 | A1 | 1/2011 | Yamasaki et al. | |
| 2011/0290580 | A1 | 12/2011 | Mukai et al. | |
| 2012/0098361 | A1 | 4/2012 | Yamasaki et al. | |
| 2012/0098365 | A1 | 4/2012 | Yamasaki et al. | |
| 2012/0098366 | A1 | 4/2012 | Yamasaki et al. | |
| 2012/0098391 | A1 | 4/2012 | Yamasaki et al. | |
| 2012/0104886 | A1 | 5/2012 | Yamasaki et al. | |
| 2012/0313467 | A1* | 12/2012 | Omae | B62D 5/0406 310/71 |
| 2013/0088128 | A1 | 4/2013 | Nakano et al. | |
| 2013/0300222 | A1* | 11/2013 | Nakano | H02K 11/0084 310/43 |
| 2014/0091683 | A1 | 4/2014 | Ito et al. | |

FOREIGN PATENT DOCUMENTS

| | | |
|---|---|---|
| EP | 2757665 A1 | 7/2014 |
| JP | 2001-250910 A | 9/2001 |
| JP | 2002-320392 A | 10/2002 |
| JP | 2009-248864 A | 10/2009 |
| JP | 2010-28925 A | 2/2010 |
| JP | 2011-30405 A | 2/2011 |
| JP | 2011-217466 A | 10/2011 |
| JP | 2011-250618 A | 12/2011 |
| WO | 97/33359 A1 | 9/1997 |
| WO | 2011142050 A1 | 11/2011 |

OTHER PUBLICATIONS

Communication dated Mar. 8, 2016 from the European Patent Office in counterpart application No. 12866931.4.

Communication dated Nov. 28, 2016 from the European Patent Office in counterpart application No. 12866931.4.

* cited by examiner

ELECTRIC POWER STEERING APPARATUS

CROSS REFERENCE TO RELATED APPLICATIONS

This application is a National Stage of International Application No. PCT/JP2012/067190 filed Jul. 5, 2012, claiming priority based on Japanese Patent Application No. 2012-012577 and 2012-012578 filed Jan. 25, 2012, the contents of all of which are incorporated herein by reference in their entirety.

TECHNICAL FIELD

The present invention relates to an electric power steering apparatus, and in more particular to an electric power steering apparatus in which a motor to assist in driver's steering force and a control device to control the motor are integrated.

BACKGROUND ART

A conventional electric power steering apparatus is constituted of a motor for assisting in mainly driver's steering force, a control device for controlling the motor, a joining device with a reduction mechanism for reducing an output of the motor and transmitting the reduced output to a steering shaft, and sensors and the like for detecting driver's steering force and the like. Note that, the apparatus including a gear portion may also be referred to as an electric power steering apparatus.

Moreover, in recent years, it can be known that an electric power steering apparatus is mounted on a whole category of wheeled vehicles, thereby revealing that, if assist functions stop due to a failure or fault of the electric power steering apparatus, it is close to impossible for the driver to rotate the steering wheel, causing difficulties in running the wheeled vehicle itself. To this end, the need is intensified to continue the assist as much as possible, depending on content of the fault. As one of the measures, an electric power steering apparatus is proposed in which a plurality of motors is provided or stator windings are provided for a motor, and at the same time, a plurality of driving circuits is also included for controlling the plurality of those (for example, refer to Patent Document 1).

In addition, as one measure for miniaturization of an electric power steering apparatus, an electric power steering apparatus of control-device integrated-type is proposed in which a motor and a control device are integrated (for example, refer to Patent Document 2). A conventional apparatus shown in Patent Document 2 is configured to place a control device at an output side of a motor (hereinafter referred to as a "front side") in a direction in which the axial center of the motor extends (hereinafter referred to as an "axial direction").

RELATED ART DOCUMENTS

Patent Documents

[Patent Document 1] Japanese Laid-Open Patent Publication No. 2011-30405
[Patent Document 2] Japanese Laid-Open Patent Publication No. 2009-248864

DISCLOSURE OF THE INVENTION

Problems to be Solved by the Invention

In a conventional electric power steering apparatus shown in Patent Document 1, its configuration is disclosed in which, though a motor itself is one, the apparatus has two sets of three-phase stator windings and two sets of inverters that are driving circuits corresponding to each of those stator windings, and also the motor and a control device are placed side by side and integrated in a direction in which an axial line or axis of an output shaft of the motor extends. In the conventional electric power steering apparatus, its power modules that are main components constituting the inverter circuits are placed in directions in which those modules' flat surfaces extend are approximately in parallel with respect to an axial direction of the motor (hereinafter this arrangement or placement is referred to as a "vertical placement"). For this reason, there arises a problem in that not only a shaft length of the electric power steering apparatus becomes longer, but also dissipation properties of produced heat become worse because a heat sink performs the vertical placement as well. Moreover, comparatively large components of capacitors and others are densely placed at the heat sink, causing a problem also in the dissipation properties of heat of those large components.

In addition, the conventional electric power steering apparatus described above is configured in such a way that the power modules perform the vertical placement, and the connection between the stator windings of the motor and the power modules is made at upper surface ends of the power modules existing at distanced positions from the motor, causing a problem in that the assembly becomes complex.

Moreover, in the conventional electric power steering apparatus shown in Patent Document 2, a recessed portion is provided in a heat sink placed in a motor's axial direction, and capacitors and others are placed in the recessed portion; however, there arises a problem in that the volumetric capacity of the heat sink is lowered because of the recessed portion provided in the heat sink, and in addition, the placement of power devices that produce a large amount of heat liberated thereby is limited due to the recessed portion.

The present invention has been directed at solving these problems in a conventional electric power steering apparatus described above, and an object of the invention is to provide an electric power steering apparatus that has a shorter shaft length and better dissipation properties of produced heat.

Means for Solving the Problems

An electric power steering apparatus according to the present invention includes
a motor having a plurality of independent stator windings, and a control device having a plurality of driving circuits for individually driving the plurality of stator windings, being configured to assist in steering force of a driver based on an output of the motor driven by the control device; and the electric power steering apparatus comprises an intermediate member being placed in the control device, and including a surface portion perpendicularly placed with respect to an axial direction of the motor, wherein the plurality of driving circuits includes a first plurality of power modules configured to house a plurality of power devices made of switching devices for controlling electric power supplied to the stator windings corresponding to the driving circuits, and a plurality of electric devices as constituent components of the driving circuits; and at least one of the following first item (1) and second item (2) is included:

(1) the first plurality of power modules of the plurality of driving circuits is individually attached on a heat sink placed at a position spaced from the surface portion of the intermediate member so that a main surface of each of the power modules is perpendicular with respect to an axial direction of the motor, and (2) the electric devices of the driving circuits are attached on the surface portion of the intermediate member so that an extending direction of a maximum outer dimension of the electric devices is perpendicular with respect to an axial direction of the motor.

In the present invention, a "main surface" of a power module means a surface, among outer surfaces of the power module, that has the largest surface area and extends approximately in a plane; a front surface or a rear surface other than a so-called side face corresponds to that surface.

Effects of the Invention

According to the electric power steering apparatus of the present invention, a shaft length is shorter, and also dissipated heat is transferred in a wide range from a heat sink to other components, so that better dissipation properties of produced heat can be achieved.

EMBODIMENTS FOR CARRYING OUT THE INVENTION

Embodiment 1

Figure 1:
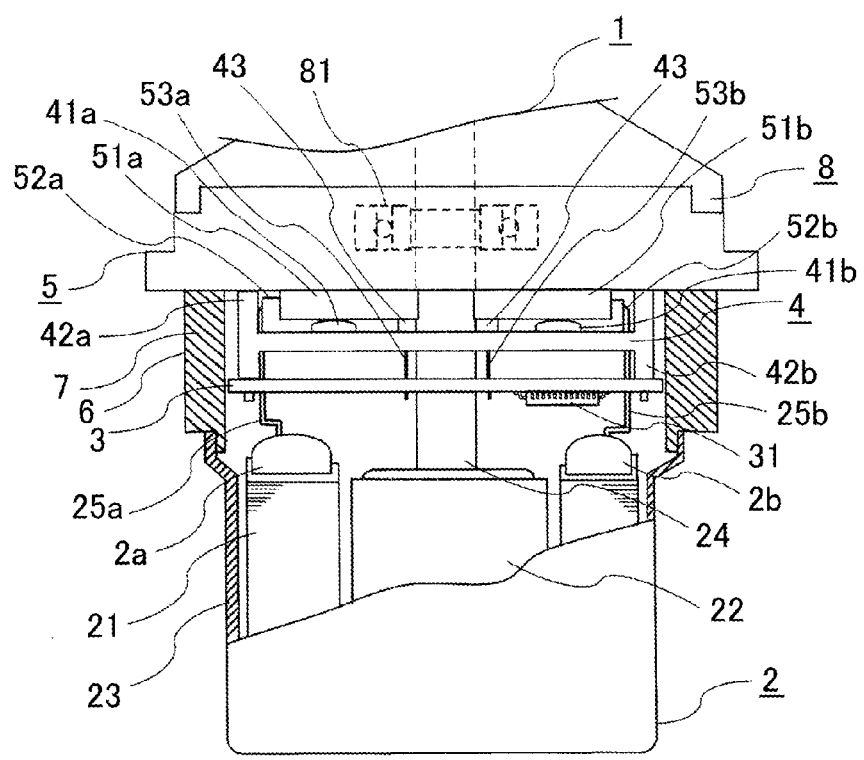
FIG. 1 is a partially cross-sectional diagram illustrating an electric power steering apparatus according to Embodiment 1 of the present invention.

Hereinafter, the explanation will be made referring to the drawings for an electric power steering apparatus according to Embodiment 1 of the present invention. FIG. 1 is a partially cross-sectional diagram illustrating the electric power steering apparatus according to Embodiment 1 of the present invention. In FIG. 1, the electric power steering apparatus 1 is constituted of a motor 2 for assisting in mainly driver's steering force, a heat sink 5 for cooling power modules as will be described later, a control device 6 that controls the motor 2, and a gear portion 8 for reducing an output of the motor 2 and transmitting the reduced output to a steering shaft (not shown in the figure). The motor 2, the control device 6, the heat sink 5 and the gear portion 8 are sequentially placed side by side in a direction in which the axial center of the motor 2 extends (hereinafter referred to as an "axial direction"), and integrated.

The motor 2 is constituted of a stator 21 including a laminated core on which a first stator winding 2a formed in a three-phase delta connection and a second stator winding 2b formed in a three-phase delta connection are wound around, a rotor 22 inserted in a central space of the stator 21, an output shaft 24 disposed in a center portion of the rotor 22, a yoke 23 for housing thereinside the stator 21, the rotor 22 and the output shaft 24. The first stator winding 2a and the second stator winding 2b form two stator windings that are independent of each other. The first stator winding 2a and a first inverter circuit 511a as will be described later constitutes a first control system of the motor 2, and the second stator winding 2b and a second inverter circuit 511b as will be described later constitutes a second control system of the motor 2.

The control device 6 is constituted of a control board 3 mounting a microcomputer (hereinafter referred to as a "CPU") 31 thereon, a first power module 51a and a second power module 51b that are the two independent power modules touching to the heat sink 5, an intermediate member 4 intervening between the heat sink 5 and the control board 3 so that they oppose to each other by means of a predetermined interspace therebetween, and a housing 7 for accommodating the control board 3, the first and second power modules 51a and 51b, and the intermediate member 4 thereinside.

The first and second power modules 51a and 51b described above are formed approximately in the shapes of sectors or fans as this will be described later, a front surface and a rear surface defining main surfaces each are perpendicularly placed with respect to the axial direction of the motor 2. An area of each of the main surfaces of the first and second power modules 51a and 51b is formed larger than an area of any one of side faces among a side face of an outer bordering portion, a side face of an inner bordering portion, and side faces of lateral bordering portions linking between the outer bordering portion and the inner bordering portion.

Winding ends 25a and 25b of the first and second stator windings 2a and 2b elongate toward the first and second power modules 51a and 51b in the axial direction of the motor 2. And then, these winding ends 25a and 25b pass through the control board 3 and, while utilizing the intermediate member 4 as guidance, are connected to winding connection terminals 52a and 52b of the first and second power modules 51a and 51b, respectively. In addition, by utilizing the intermediate member 4 as the guidance, the intermediate member also contributes to taking a vibration countermeasure of the windings.

Note that, it may be adopted that the winding ends 25a and 25b of the first and second stator windings 2a and 2b do not pass through the control board 3, but pass by the circumference of the control board 3 and, while using the intermediate member 4 as guidance, are connected to each of the connection terminals 52a and 52b of the first and second power modules 51a and 51b. In addition, it is also suitable that positions interconnecting the connection terminals 52a and 52b of the first and second power modules 51a and 51b and each of the winding ends 25a and 25b of the first and second stator windings 2a and 2b are not only in a space between the intermediate member 4 and the first and second power modules 51a and 51b illustrated in FIG. 1, but also in a space between the control board 3 and the intermediate member 4, or on the other hand, between the first and second stator windings 2a and 2b, and the control board 3; those interconnections can be implemented by elongating each of the connection terminals 52a and 52b, and each of the winding ends 25a and 25b to the positions of those spaces, and, considering assembling capability of the electric power steering apparatus, those interconnection positions can be arbitrarily selected.

The CPU 31 in the control device 6 calculates control values appropriate to the electric currents to be supplied to the motor 2, and outputs control signals based on the calculated result. The control signals outputted from the CPU 31 are transmitted to the first and second power modules 51a and 51b by way of first control terminals 53a and second control terminals 53b, respectively. In addition, as this will be described later, it is so constructed that terminal voltages, currents and the like of the motor 2 are transmitted from the first and second power modules 51a and 51b to the CPU 31 by way of each of the connection terminals 53a and 53b, and those are monitored in the CPU 31.

The heat sink 5 is placed in the axial direction of the motor with respect to the motor, and at the same time, includes flat surfaces that perpendicularly extend with respect to the axial direction of the motor. On a side of one end-face (upper end-face of FIG. 1) of the heat sink 5 in the axial direction, the gear portion 8 that transmits assist torque from the motor 2 to the steering wheel or tires is fixed to bring into close contact with the heat sink; on a flat surface thereof on a side of the other end-face (lower end-face of FIG. 1) in the axial direction, main surfaces of the first and second power modules 51a and 51b are fixed to bring into close contact with the heat sink. Here, the "main surfaces" of the power modules 51a and 51b each mean those surfaces, among outer surfaces of the power modules, that have the largest surface areas and extend approximately in planes; the front surfaces or rear surfaces other than the so-called side faces correspond to those main surfaces.

Heat produced by the operations of the first and second power modules 51a and 51b is dissipated through the heat sink 5, and at the same time, transferred by way of the heat sink 5 also to the gear portion 8 and then dissipated as heat. For this reason, it is desirable that the heat sink 5 is made of a material having better heat dissipation properties, for example, of aluminum. In a central portion of the heat sink 5, a bearing 81 is fixed. The bearing 81 supports the output shaft 24 of the motor 2 to be rotationally movable, and at the same time, serves a role of positioning the axial center of the output shaft 24.

On the intermediate member 4, first protrusions 41a and second protrusions 41b for pressing the first and second power modules 51a and 51b into close contact with the heat sink 5 are provided corresponding to the first and second power modules 51a and 51b, respectively. These first and second protrusions 41a and 41b bring the first and second power modules 51a and 51b into close contact with the heat sink 5 by pressing the first and second power modules 51a and 51b toward a side of the heat sink 5.

Figure 2:
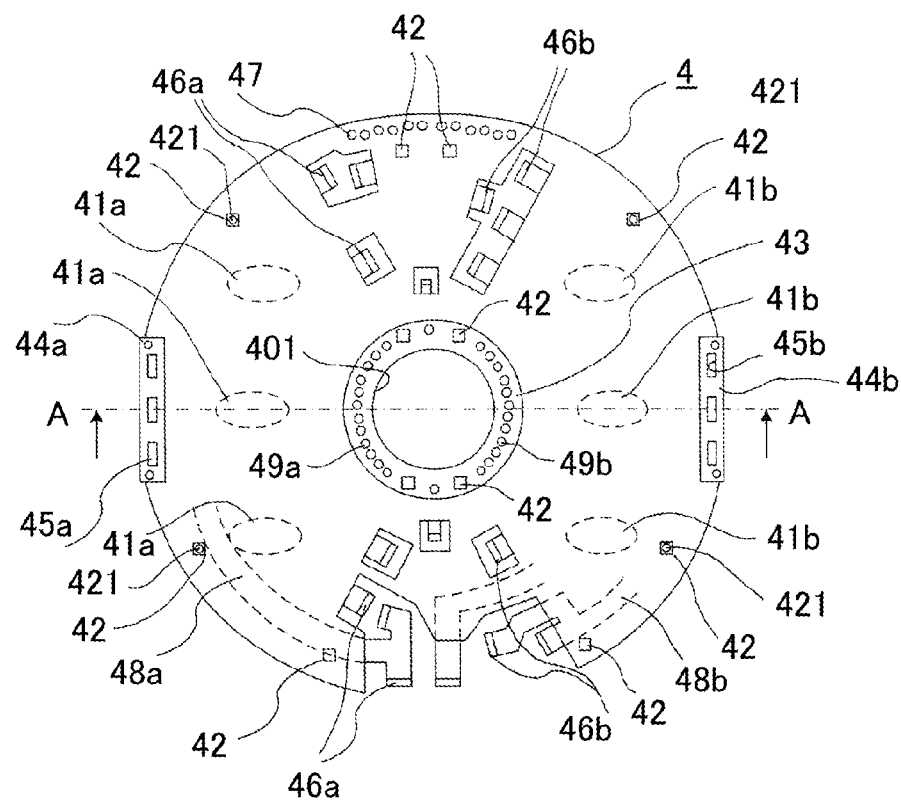
FIG. 2 is a plan view of an intermediate member in the electric power steering apparatus according to Embodiment 1 of the present invention.
Figure 3:
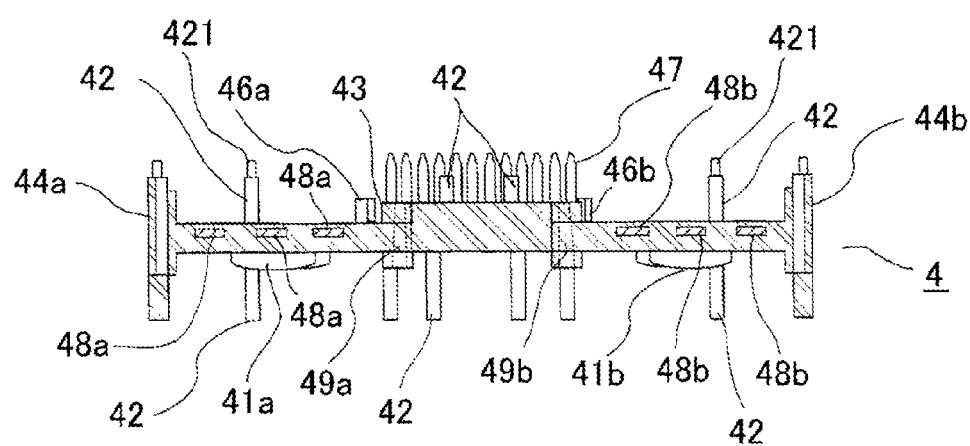
FIG. 3 is a cross-sectional diagram taken along the line A-A of FIG. 2 and viewed in the directions of the arrows.

Next, the explanation will be made for the intermediate member 4. FIG. 2 is a plan view of the intermediate member in the electric power steering apparatus according to Embodiment 1 of the present invention, and FIG. 3 is a cross-sectional diagram taken along the line A-A of FIG. 2 and viewed in the directions of the arrows. In FIG. 1 through FIG. 3, the intermediate member 4 is formed approximately in a circular shape as suitably shown in FIG. 2, and is made of an electrical insulation resin in its entirety.

The first and second protrusions 41a and 41b described above are provided on a set of three basis; the first protrusions 41a are provided vertically in a row at the left side of FIG. 2 with respect to the center of the intermediate member 4, mutually intervening interspaces; and the second protrusions 41b are provided vertically in a row at the right side of FIG. 2 with respect to the center of the intermediate member 4, mutually intervening interspaces. On both end-faces of the intermediate member 4 in the axial direction, a plurality of leg portions 42 is provided each protruding in the axial direction. Among these leg portions 42, cylindrical portions 421 extending in the axial direction are further formed on the four leg portions 42 provided on an end-face in the intermediate member 4 on a side of the control board 3, and these cylindrical portions 421 are inserted into holes provided in the control board 3, so that positioning of the control board 3 and its supporting are performed.

In the intermediate member 4, a plurality of first conductor portions 48a to be connected to the first power module 51a, and a plurality of second conductor portions 48b to be connected to the second power module 51b are buried. The plurality of first conductor portions 48a buried in the intermediate member 4 is partially exposed from cutout parts of the intermediate member 4 to become a plurality of first conductor terminals 46a to be connected to the first power module 51a. Similarly, the plurality of second conductor portions 48b buried in the intermediate member 4 is partially exposed in part from cutout parts of the intermediate member 4 to become a plurality of first conductor terminals 46b to be connected to the second power module 51b. The plurality of first conductor portions 48a, and the plurality of second conductor portions 48b buried in the intermediate member 4 become power-source lines connected to a power source such as a battery or the like, and ground lines connected to a ground level of a wheeled vehicle, respectively.

A central hole 401 made in a middle portion of the intermediate member 4 is passed through by the output shaft 24 of the motor 2, and a guiding portion 43 is formed in the surroundings of the central hole 401. In this guiding portion 43, first and second small holes 49a and 49b passing through in the axial direction of a shaft center are made on the plurality of holes basis. Into these small holes 49a and 49b, conductor pins from the first and second power modules 51a and 51b are inserted. In addition, first and second screen-shaped guides 44a and 44b as guiding portions including a plurality of rectangular holes 45a and 45b through which the winding ends 25a and 25b pass are provided at both end-edge portions of the intermediate member 4, respectively. The rectangularly shaped holes 45a and 45b described above are made on a set of three basis, and it is so configured that, by passing each of the winding ends 25a and 25b through these rectangular holes 45a and 45b, guidance and positioning are performed for the winding ends 25a and 25b.

Moreover, in a portion of the intermediate member 4, a plurality of conductor pins 47 that leads electric wiring, for example, sensor signals, and power-source and ground lines from a wheeled vehicle, is provided so that the pins protrude in the axial direction.

As illustrated in FIG. 1, the control device 6 is placed in the axial direction of the motor 2 between the motor 2 and the gear portion 8, and the output shaft 24 of the motor 2 passes through in the center of the control device 6. An order of assembly of the electric power steering apparatus 1 structured as described above proceeds with the order in that, first, the intermediate member 4 and the first and second power modules 51a and 51b are overlaid with each other; moreover, the control board 3 is stacked thereon, and the control device 6 is assembled; after having combined the control device 6 in the axial direction of a shaft center of the motor 2, the housing 7 and the heat sink 5 are assembled; and finally, the gear portion 8 is integrated.

While on the other hand, as another order of assembly, it is also possible to arrange that, first, the control board 3, the intermediate member 4 and the first and second power modules 51a and 51b are sequentially stacked upon the motor 2; next, the housing 7 and the heat sink 5 are attached thereto; and finally, the gear portion 8 is assembled. Moreover, when the housing 7 is divided into a plurality of pieces, it may be adopted that the first and second power modules 51a and 51b are mounted in an upper portion of the heat sink 5 (the case in FIG. 1 is in a lower portion of the heat sink); next, the intermediate member 4 and the control board 3 are assembled altogether, and connected to the motor 2; and afterward, the housing 7 and the gear portion 8 are assembled.

Figure 4:
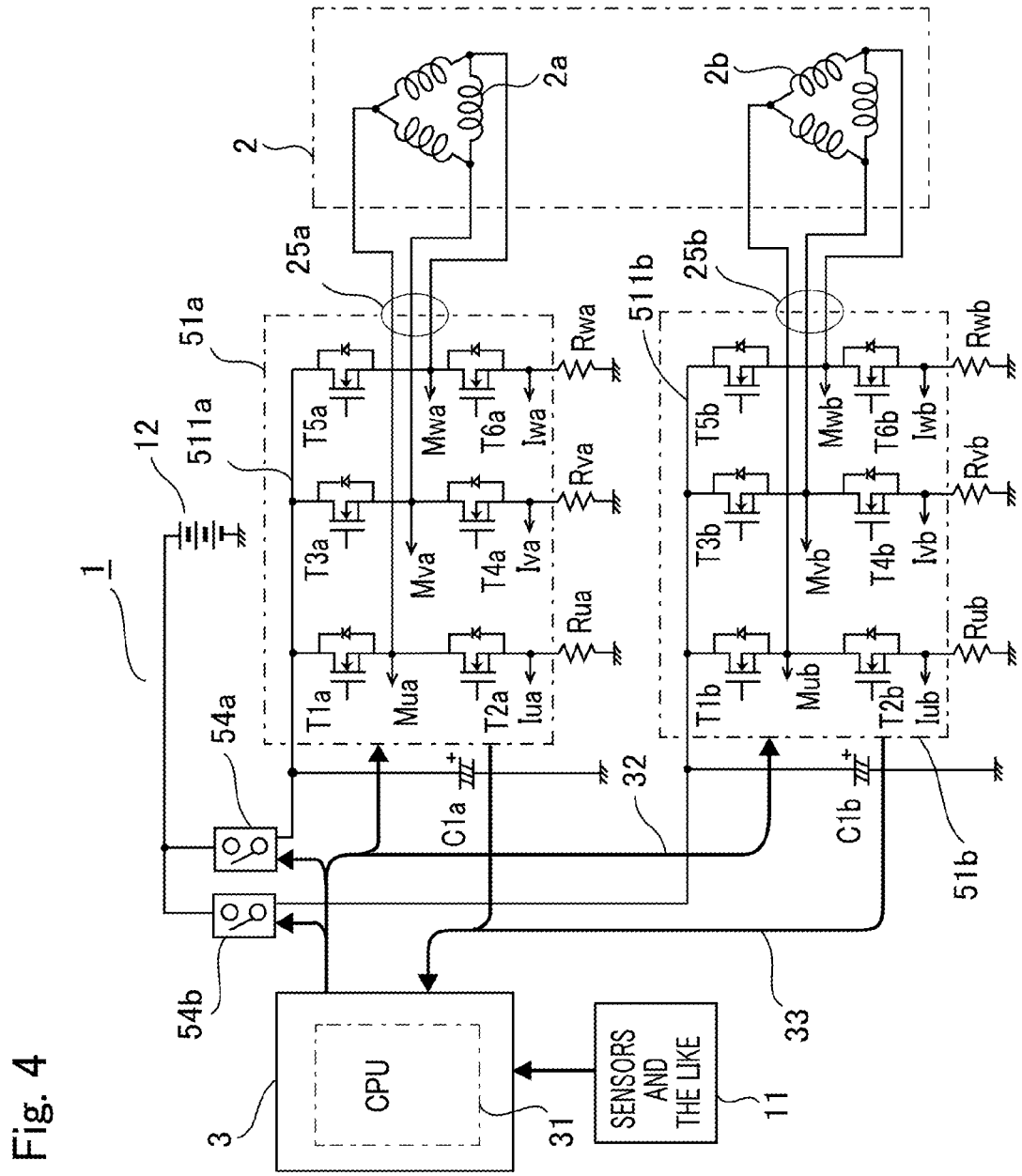
FIG. 4 is a diagram illustrating a circuit configuration of the electric power steering apparatus according to Embodiment 1 of the present invention.

Next, the explanation will be made for the electric power steering apparatus according to Embodiment 1 of the present invention from an electrical circuitry point of view. FIG. 4 is a diagram illustrating a circuit configuration of the electric power steering apparatus according to Embodiment 1 of the present invention. In FIG. 4, the electric power steering apparatus 1 according to Embodiment 1 of the present invention 1 includes the motor 2 for producing driving force to assist in driver's steering force, the first inverter circuit 511a as a first driving circuit, the second inverter circuit 511b as a second driving circuit, the CPU 31 mounted on the control board 3, a battery 12 mounted on a wheeled vehicle, a first relay 54a made of field-effect transistors (hereinafter referred to as "FETs") for controlling power-source supply from the battery 12 to the first inverter circuit 511a, a second relay 54b made of FETs for controlling power-source supply from the battery 12 to the second inverter circuit 511b, and sensors and the like 11 for detecting driver's steering torque, a vehicle speed, and the like. Symbols "25a" and "25b" are the winding ends of the first and second stator windings 2a and 2b described in FIG. 1.

The first inverter circuit 511a is built in the first power module 51a, and is constituted of switching devices T1a, T2a, T3a, T4a, T5a and T6a as six power devices made of FETs, three shunt resistors Rua, Rva and Rwa, and one smoothing capacitor C1a. Among the six switching devices, the switching devices T1a, T3a and T5a are inserted in a phase-U upper arm, a phase-V upper arm and a phase-W upper arm of a three-phase bridge circuit, respectively, and the switching devices T2a, T4a and T6a are inserted in a phase-U lower arm, a phase-V lower arm and a phase-W lower arm of the three-phase bridge circuit, respectively.

The shunt resistors Rua, Rva and Rwa provided for detecting motor currents as will be described later are connected between the switching devices T2a, T4a and T6a, respectively, and to a ground level of a wheeled vehicle. The smoothing capacitor C1a connected between a common connecting portion of the switching devices T1a, T3a and T5a, and the ground level of the wheeled vehicle is provided for smoothing a power-source voltage supplied to the first inverter circuit 511a.

A phase-U alternating-current (AC) terminal that is a series connecting portion between the switching device T1a and the switching device T2a is connected to a phase-U terminal of the first stator winding 2a of the motor 2; a phase-V AC terminal that is a series connecting portion between the switching device T3a and the switching device T4a, connected to a phase-V terminal of the first stator winding 2a; and a phase-W AC terminal that is a series connecting portion between the switching device T5a and the switching device T6a, connected to a phase-W terminal of the first stator winding 2a.

Each end of upper arms in each phase of a three-phase bridge circuit configured to include the respective switching devices T1a, T3a and T5a is mutually connected in common to form a positive electrode-side DC terminal of the first inverter circuit 511a, and is connected to a positive electrode-side terminal of the battery 12 by way of the first relay 54a. Meanwhile, each end of lower arms in each phase of the three-phase bridge circuit configured to include the respective switching devices T2a, T4a and T6a forms negative electrode-side DC terminals of the first inverter circuit 511a, and is connected to the ground level of the vehicle through the shunt resistors Rua, Rva and Rwa, respectively.

The second inverter circuit 511b is built in the second power module 51b, and is constituted of switching devices T1b, T2b, T3b, T4b, T5b and T6b as six power devices made of FETs, three shunt resistors Rub, Rvb and Rwb, and one smoothing capacitor C1b. Among the six switching devices, the switching devices T1b, T3b and T5b are inserted in a phase-U upper arm, a phase-V upper arm and a phase-W upper arm of a three-phase bridge circuit, respectively, and the switching devices T2b, T4b and T6b are inserted in a phase-U lower arm, a phase-V lower arm and a phase-W lower arm of the three-phase bridge circuit, respectively.

The shunt resistors Rub, Rvb and Rwb provided for detecting motor currents are connected between the switching devices T2b, T4b and T6b, respectively, and to the ground level of the vehicle. The smoothing capacitor C1b connected between a common connecting portion of the switching devices T1b, T3b and T5b, and the ground level of the vehicle is provided for smoothing a power-source voltage supplied to the second inverter circuit 511b.

A phase-U AC terminal that is a series connecting portion between the switching device T1b and the switching device T2b is connected to a phase-U terminal of the second stator winding 2b of the motor 2; a phase-V AC terminal that is a series connecting portion between the switching device T3b and the switching device T4b is connected to a phase-V terminal of the second stator winding 2b; and a phase-W AC terminal that is a series connecting portion between the switching device T5b and the switching device T6b is connected to a phase-W terminal of the second stator winding 2b.

Each end of upper arms in each phase of a three-phase bridge circuit configured to include the respective switching devices T1b, T3b and T5b is mutually connected in common to form a positive electrode-side DC terminal of the second inverter circuit 511b, and is connected to the positive electrode-side terminal of the battery 12 by way of the second relay 54b. Meanwhile, each end of lower arms in each phase of the three-phase bridge circuit configured to include the respective switching devices T2b, T4b and T6b forms negative electrode-side DC terminals of the second inverter circuit 511b, and is connected to the ground level of the vehicle through the shunt resistors Rub, Rvb and Rwb, respectively.

The CPU 31 mounted on the control board 3 calculates control values corresponding to target current values to drive the motor 2 using information from the sensors and the like 11 mounted on a wheeled vehicle, and gives the calculated control values to the gates of each of the switching devices of the first and second inverter circuits 511a and 511b by way of signal lines 32, so that these switching devices are subjected to PWM controls.

The motor 2 is driven by three-phase AC power that is subjected to the PWM controls by the first inverter circuit 511a and the second inverter circuit, and produces desired assist torque that is added to a steering shaft (not shown in the figures) by way of the gear portion 8 described above. The target current control-values calculated by the CPU 31 are distributed between the first inverter circuit 511a and the second inverter circuit 511b, so that the quantities of electric currents are shared by the first stator winding 2a and the second stator winding 2b. This sharing ratio can be arbitrarily set.

A phase-U terminal voltage Mua, a phase-V terminal voltage Mva and a phase-W terminal voltage Mwa of the first stator winding 2a derived from a phase-U AC terminal, a phase-V AC terminal and a phase-W AC terminal of the first inverter circuit 511a are inputted into the CPU 31 by way of signal lines 33, respectively. In addition, a phase-U motor current Iua, a phase-V motor current Iva and a phase-W motor current Iwa that flow in the first stator winding 2a are derived from the connecting portions between each of the shunt resistors Rua, Rva and Rwa, and each of the switching devices T2a, T4a and T6a of the first inverter circuit 511a, and are inputted into the CPU 31 by way of the signal lines 33, respectively.

Similarly, a phase-U terminal voltage Mub, a phase-V terminal voltage Mvb and a phase-W terminal voltage Mwb of the second stator winding 2b derived from a phase-U AC terminal, a phase-V AC terminal and a phase-W AC terminal of the second inverter circuit 511b are inputted into the CPU 31 by way of the signal lines 33, respectively. In addition, a phase-U motor current Iub, a phase-V motor current Ivb and a phase-W motor current Iwb that flow in the second stator winding 2b are derived from the connecting portions between each of the shunt resistors Rub, Rvb and Rwb, and each of the switching devices T2b, T4b and T6b of the second inverter circuit 511b, and are inputted into the CPU 31 by way of the signal lines 33, respectively.

In the electric power steering apparatus configured as described above according to Embodiment 1 of the present invention, the quantities of electric currents of the first stator winding 2a and the second stator winding 2b are controlled based on an output from the CPU 31, for example, in accordance with predetermined sharing values, so that desired assist torque is produced on the motor 2. Namely, the CPU 31 calculates target current control-values of the motor 2 based on information of driver's steering torque, a vehicle speed and the like inputted from the sensors and the like 11 as described above, and supplies gate signals corresponding to the aforementioned sharing values in response to the calculated target current control-values to the gates of each of the switching devices of the first inverter circuit 511a by way of the signal lines 32, so that the switching devices thereof are subjected to a PWM control. Similarly, the CPU supplies gate signals corresponding to the aforementioned sharing values in response to the calculated target current control-values described above to the gates of each of the switching devices of the second inverter circuit 511b by way of the signal lines 32, so that the switching devices thereof are subjected to a PWM control.

The motor 2 is driven in accordance with the first stator winding 2a that is energized by three-phase AC power subjected to the PWM control by the first inverter circuit 511a, and with the second inverter circuit 511b that is energized by three-phase AC power subjected to the PWM control by the second stator winding 2b, so that assist torque corresponding to driver's steering torque and a vehicle speed is produced and added to a steering shaft (not shown in the figures).

Note that, it is also possible to operate that open/close control of the first and second relays 54a and 54b is performed by instructions from the CPU 31, and that either the first inverter circuit 511a or the second inverter circuit 511b may be only selected to drive the motor 2, so that the other system is put into a resting state.

Figure 5:
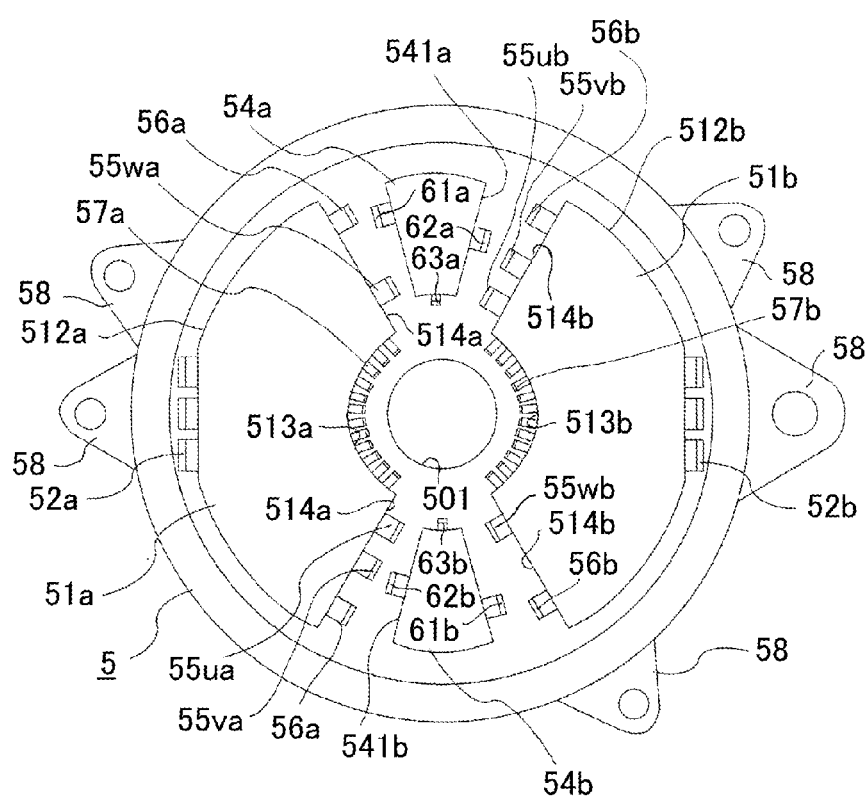
FIG. 5 is a plan view of the interior of a control device illustrating placement of power modules in the electric power steering apparatus according to Embodiment 1 of the present invention.

Next, the explanation will be made for an arrangement or placement of the first and second power modules 51a and 51b or the like building therein the aforementioned switching devices that are power devices producing a large amount of heat liberated thereby. FIG. 5 is a plan view of the interior of a control device illustrating the placement of the power modules in the electric power steering apparatus according to Embodiment 1 of the present invention, illustrating a state in which the first and second power modules 51a and 51b are fixed to bring into close contact with the heat sink 5 on its flat surface on a side of the other end-face (lower end-face of FIG. 1) described above.

In FIG. 5, on the heat sink 5, the first and second relays 54a and 54b described above are mounted, in addition to the first and second power modules 51a and 51b. The first and second power modules 51a and 51b, and the first and second relays 54a and 54b produce a large amount of heat liberated thereby due to large currents that flow therethrough; the large current cannot be flown therethrough without enhancing heat dissipation effects. The entirety of the control device 6 is placed at an upper portion of the motor 2 in FIG. 1, and each of the components constituting the control device 6 is integrally fixed on the motor 2; moreover, the heat sink 5 formed approximately in a circular shape is fixed on the housing 7 of the control device 6.

The first power module 51a and the second power module 51b are placed on the surface of the heat sink 5 approximately in the entirety of the surface, equally on both sides sandwiching the center therebetween. And then, in order to achieve larger contact areas with the heat sink 5, the first and second power modules 51a and 51b each are formed approximately in the shapes of sectors or fans to suit along the outside shape of the heat sink 5.

In order to lead out the winding connection terminals 52a and 52b described above, outer bordering portions 512a and 512b of the first and second power modules 51a and 51b are formed with their arcs linearly cut out in parts, but outer bordering portions extending on both sides from the linear portions are formed in arc shapes; and in addition, inner bordering portions 513a and 513b of the first and second power modules 51a and 51b are formed in arc shapes along a central hole 501 of the heat sink 5 for passing through the output shaft 24, and control terminals 57a and 57b are led out on a set of twelve basis.

In addition, lateral side portions 514a and 514b linking between the outer bordering portions 512a and 512b of the first and second power modules 51a and 51b, and the inner bordering portions 513a and 513b thereof are linearly formed, respectively, along straight lines radially extending from the center portion of the heat sink 5. Three resistor connection terminals 55ua, 55va and 55wa to be connected to two power-source line connection terminals 56a of the first power module 51a, and the shunt resistors Rua, Rva and Rwa described above, respectively, are led out from the lateral side portions 514a of the power module 51a. Three resistor connection terminals 55ub, 55vb and 55wb to be connected to two power-source line connection terminals 56b of the second power module 51b, and the shunt resistors Rub, Rvb and Rwb described above, respectively, are led out from the lateral side portions 514b of the power module 51b.

One pair among the two pairs of power-source line connection terminals 56a and 56b is connected to a part of the conductor portions 48a and 48b to become power-source lines buried in the intermediate member 4, respectively, and the other pair is connected by way of the smoothing capacitors C1a and C1b to a part of the conductor portions 48a and 48b to become ground lines buried in the intermediate member 4, respectively.

The first and second relays 54a and 54b serving as electronic relays having been molded approximately in the shapes of sectors or fans using a resin mold material are placed between the first and second power modules 51a and 51b each formed approximately in the shapes of sectors or fans, and are fixed to bring into close contact with the flat surface on a side of the other end-face (lower end-face of FIG. 1) of the heat sink 5. In lateral side portions 541a linearly formed on both sides of the first relay 54a, individually led out are an input-side terminal 61a to be connected to one of the conductor portions 48a to become power-source lines buried in the intermediate member 4, and an output-side terminal 62a to be connected to one of the power-source line connection terminals 56a of the first power module 51a; and a control terminal 63a is led out in an inner bordering portion of the relay. In lateral side portions 541b linearly formed on both sides of the second relay 54b, individually led out are an input-side terminal 61b to be connected to one of the conductor portions 48b to become power-source lines buried in the intermediate member 4, and an output-side terminal 62b to be connected to one of the power-source line connection terminals 56b of the second power module 51b; and a control terminal 63b is led out in an inner bordering portion of the relay.

On the circumference of the heat sink 5, a plurality of flange portions 58 including screw holes is placed in a distributed manner. These flange portions 58 are partially flange portions for fixing the heat sink 5 to the gear portion 8, and other flange portions are for fixing the motor 2 and the control device 6 therebetween.

As described above, in order to secure effective cooling areas, the outside shapes of the first and second power modules 51a and 51b are formed approximately in the shapes of sectors or fans, and moreover, connection terminals and the like are not collectively placed at one place as well, but the distributed placement is performed. Those terminals are separated in particular according to the quantities of current capacities so that the control terminals 57a and 57b through which small currents flow are collectively placed on the inner bordering portions 513a and 513b.

Next, the explanation will be made for the switching devices as power devices in the first and second power modules 51a and 51b. In FIG. 2 through FIG. 4, the explanation is made for a case in which each of the first and second power modules 51a and 51b is formed by building the switching devices T1a through T6a, and T1b through T6b made of FETs connected to upper arms and lower arms in each phase, to be connected to the winding ends 25a and 25b of the first and second stator windings 2a and 2b, in one package on a set of six devices per module basis, respectively; however, various types are conceivable for the circuits built in the power modules as this will be described below.

Figure 6A:
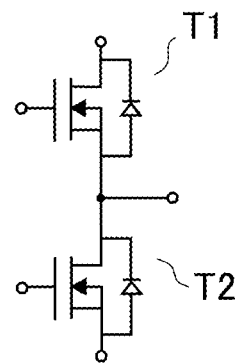
FIGS. 6A, 6B, 6C and 6D are circuit diagrams for the power modules in the electric power steering apparatus according to Embodiment 1 of the present invention.
Figure 6B:
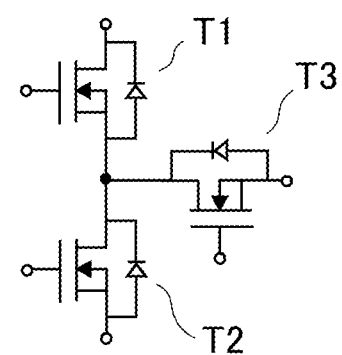

FIGS. 6A, 6B, 6C and 6D are circuit diagrams for the power modules in the electric power steering apparatus according to Embodiment 1 of the present invention. Among FIGS. 6A, 6B, 6C and 6D, FIG. 6A shows a case in which two switching devices T1 and T2 made of FETs of one pair of upper and lower arms are only built in one power module for every one of the phases. FIG. 6B is a module in another case in which three switching devices T1, T2 and T3 made of FETs are built in to make one power module; the one switching device T3 is to be inserted between the winding ends 25a and 25b each of the motor 2, and a connection point of the switching devices T1 and T2 of one pair of upper and lower arms. The switching device T3 can perform turn-on and turn-off control of the connections between the winding ends 25a and 25b each of the motor 2, and each of the switching devices T1 and T2 of the upper and lower arms, and so to speak, serves a role of a motor relay.

Figure 6C:
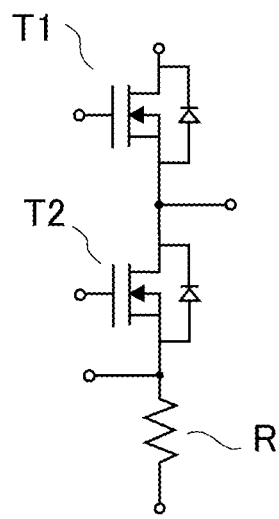
Figure 6D:
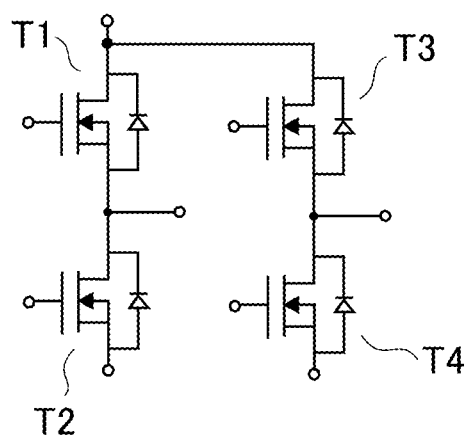

FIG. 6C is a module in yet another case in which switching devices T1 and T2 made of one pair of upper and lower FETs and a shunt resistor R for the use of detecting an electric current are built in to form one power module. FIG. 6D is a module in yet another case in which switching devices T1 through T4 made of two pairs of upper and lower FETs are built in to make one power module. This type of power module shown in FIG. 6D can in particular configure a figure-H formed bridge, and is suitable in control for a brush motor.

According to the above, by building in the switching devices that are a plurality of power devices while considering a type of the motor, its functions and the like, it is possible to implement various types of power modules. Note that, the hollow circles "○" in FIGS. 6A, 6B, 6C and 6D designate the terminals led-out from the power modules.

In addition, it is possible to arrange that the first and second relays 54a and 54b serving as electronic relays described above are also made of power modules; it is also possible to arrange that a plurality of FETs equivalent to those for motor use is connected in parallel, and/or the two chips are mounted on the same board to be made as one component by its outer appearance. According to the above, modules in which a plurality of power devices is mounted are the power modules.

Embodiment 2

In Embodiment 1 described above, the apparatus is shown in a case in which the control device is mounted in a direction of motor's output, namely on a front side of the motor; to describe in more detail, the electric power steering apparatus is shown in which, on the front side of the motor, the control device, the heat sink and a gear portion are in this order placed side by side sequentially in the axial direction of the motor, and those are integrated. However, in an electric power steering apparatus according to Embodiment 2 of the present invention described below, the control device is mounted in a direction opposite to the motor's output, namely on a rear side of the motor; to describe in more detail, the apparatus is so arranged that the heat sink and the control device are in this order placed side by side on the rear side of the motor, sequentially in the axial direction of the motor, and those are integrally fixed, and that, at the same time, the gear portion is placed side by side on the front side of the motor in the axial direction of the motor, and those are integrally fixed.

Figure 7:
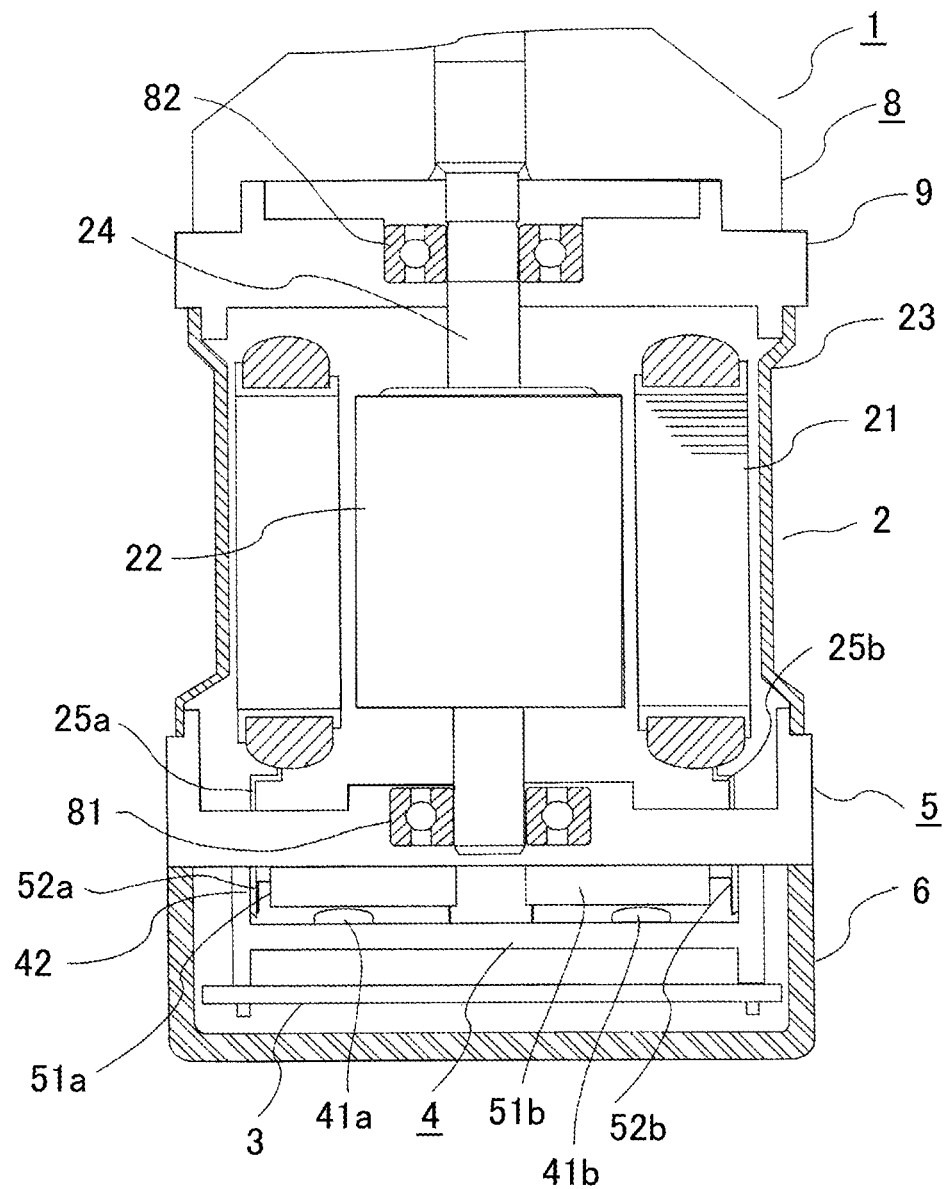
FIG. 7 is a cross-sectional diagram of an electric power steering apparatus according to Embodiment 2 of the present invention.

FIG. 7 is a cross-sectional diagram of the electric power steering apparatus according to Embodiment 2 of the present invention. In FIG. 7, the control device 6 is placed in the in the axial direction of the motor 2, and mounted in the direction opposite to the output of the motor 2, namely on the rear side that is opposite to the front side of the motor 2. To describe in more specific, the electric power steering apparatus 1 is constituted of the motor 2, the heat sink 5, the control device 6 and the gear portion 8, and in the axial direction of the motor 2, the control device 6, the heat sink 5, the motor 2 and the gear portion 8 are in this order placed side by side and integrated.

The control device 6 is assembled by stacking the first and second power modules 51a and 51b that are fixed on an end-face of the heat sink 5 on a side opposite to the motor to bring into close contact with the heat sink fixed on the rear side of the motor 2, the intermediate member 4, and the control board 3 in this order. On the intermediate member 4, the first and second protrusions 41a and 41b are formed similarly to Embodiment 1. The first and second power modules 51a and 51b are pressed by these first and second protrusions 41a and 41b toward the heat sink 5. Each of the winding connection terminals 52a and 52b of the first and second power modules 51a and 51b is connected to the respective winding ends 25a and 25b, being passing through the heat sink 5, of the first and second stator windings 2a and 2b of the motor 2.

A front bracket 9 of the motor 2 not only fixes a bearing 82 that supports the output shaft 24 to be rotationally movable, but also includes a structure in which the gear portion 8 and the yoke 23 of the motor 2 can be assembled together.

What is largely different from Embodiment 1 is that, because the directions in which the winding ends 25a and 25b of the first and second stator windings 2a and 2b of the motor 2 are led-out differ from the case in Embodiment 1, connection methods differ between the winding ends 25a and 25b, and the first and second power modules 51a and 51b, and also the intermediate member 4.

Namely, in Embodiment 1, the winding ends 25a and 25b of the motor 2 are connected to each of the winding connection terminals 52a and 52b of the first and second power modules 51a and 51b by passing through the control board 3, and the screen-shaped guides 44a and 44b of the intermediate member 4, or connected to each of the winding connection terminals 52a and 52b of the first and second power modules 51a and 51b by way of conductors in the intermediate member 4. However, in the configuration of Embodiment 2, the winding ends 25a and 25b of the motor 2 can be directly connected to each of the winding connection terminals 52a and 52b of the first and second power modules 51a and 51b. Note that, in Embodiment 2, it is necessary to provide through holes in the heat sink 5 so that each of the winding ends 25a and 25b is passed through those through holes. The through holes of the heat sink 5 serve a role of guidance for each of the winding ends 25a and 25b, and thus, it is also possible to secure electrical insulation capability to the heat sink 5 by intervening electrically non-conductive bushings between the through holes and windings, and at the same time, to take a vibration countermeasure of the windings.

The heat sink 5 touches to the yoke 23 of the motor 2, so that heat of the heat sink 5 is transferred as heat also to the yoke 23. On the contrary, when heat produced by the motor 2 is comparatively larger, it is also possible to transfer the heat on the side of the motor 2 to the heat sink 5.

Note that, it may be adopted that the winding ends 25a and 25b of the first and second stator windings 2a and 2b pass through the heat sink 5 and, similarly to Embodiment 1, pass in the vicinity of the first and second power modules 51a and 51b, and are connected to each of the winding connection terminals 52a and 52b of the first and second power modules 51a and 51b by utilizing the intermediate member 4.

As explained above, according to the electric power steering apparatus in Embodiment 2 of the present invention, an effect can be achieved in that, using a component configuration similar to a case in Embodiment 1 in which the control device is placed on the front side of the motor, the control device is placed on the rear side of the motor, so that the design can be carried out under the basic structure identical to the case of Embodiment 1, and in addition, part of components can be commonly used. Moreover, it is not necessary to provide holes in the heat sink, the intermediate member and the control board for passing the output shaft of the motor therethrough, so that an effect can be achieved as effectively utilizing an area of each of the components.

Embodiment 3

In Embodiment 1 and Embodiment 2 described above, it has been so arranged that, for the respective two independent systems including each of the first and second stator windings, the switching devices as power devices made of FETs through which large currents flow are built in the first and second power modules, and these first and second power modules equally split on the heat sink for the individual systems are placed in the vicinity of the winding ends of the stator windings corresponding thereto, and that, at the same time, the shunt resistors corresponding to each of the power modules are placed in the vicinity of those winding ends. In cases of these embodiments, there exists an advantage in that, from a viewpoint of electrical connections, the electrical connections themselves can be shortened.

However, in a case in which one control system between the two control systems becomes faulty, or usage frequency and/or operating currents of each of the control systems are not equally balanced, there is an advantageous case from a viewpoint of thermal diffusion or heat dissipation in that the power devices are not split for individual control systems, but power devices of the other control system are rather placed in a mixed manner at the winding ends of respective control systems.

An electric power steering apparatus according to Embodiment 3 of the present invention is an apparatus in which power devices are not placed for the individual control systems, but placed at the winding ends of respective control systems in such a manner of so-called mixed placement in that power devices of the other control system are mixed and split.

Here, the explanation will be made for an example of the mixed placement described above, specifically referring to FIG. 4. First, each of pairs of the switching devices T1a and T2a, T3a and T4a, and T5a and T6a at the upper and lower arms of the first inverter circuit 511a forms as one pair, and in addition, each of pairs of the switching devices T1b and T2b, T3b and T4b, and T5b and T6b at the upper and lower arms of the second inverter circuit 511b forms as one pair; the power modules are made for every one pair of those switching devices.

And then, six switching devices made of each of the pairs of the switching devices T1a and T2a, and T3a and T4a of the first inverter circuit 511a, and the pair of the switching devices T1b and T2b of the second inverter circuit 511b are placed in the neighborhood; and, in the vicinity where these switching devices are placed, the phase-U and phase-V winding ends 25a of the first stator winding 2a of the motor 2, and the phase-U winding end 25b of the second stator winding 2b thereof are placed after having those winding ends mixed and elongated.

Moreover, six switching devices made of each of the pairs of the switching devices T3b and T4b, and T5b and T6b of the second inverter circuit 511b, and the pair of the switching devices T5a and T6a of the first inverter circuit 511a are placed in the neighborhood; and, in the vicinity where these switching devices are placed, the phase-V and phase-W winding ends 25b of the second stator winding 2b of the motor 2, and the phase-W winding end 25a of the first stator winding 2a thereof are placed after having those winding ends mixed and elongated.

Note that, the mixed placement is not limited to this specific example. Other constituent items and things are equivalent or similar to those in Embodiment 1 or Embodiment 2.

In a case of the mixed placement described above, it is possible to arrange that the number of power modules are not two modules for every one of the control systems, but the two power modules are for every one of the modules per the mixed placement described above; however, splitting into three or more modules results in a higher degree of freedom from a mounting or assembling viewpoint. For example, it may be adopted as described above that power modules are made for every pair of two switching devices, or on the other hand, that one power module is made by pairs of the switching devices T1a and T2a, and T3a and T4a of the first inverter circuit 511a; one power module is made by a pair of the switching devices T1b and T2b of the second inverter circuit 511b; one power module is made by a pair of the switching devices T3b and T4b, and a pair of T5b and T6b of the second inverter circuit 511b; and moreover, one power module is made by a pair of the switching devices T5a and T6a of the first inverter circuit 511a. In the latter case, four power modules are made; however, it is possible to perform the mixed placement described above with ease.

As described above, according to the electric power steering apparatus in Embodiment 3 of the present invention, the diffusion or dissipation of produced heat can be better equalized by placing the power devices mixed with the switching devices and the like of the other control system, when control values of both the control systems differ to each other.

Embodiment 4

Figure 8:
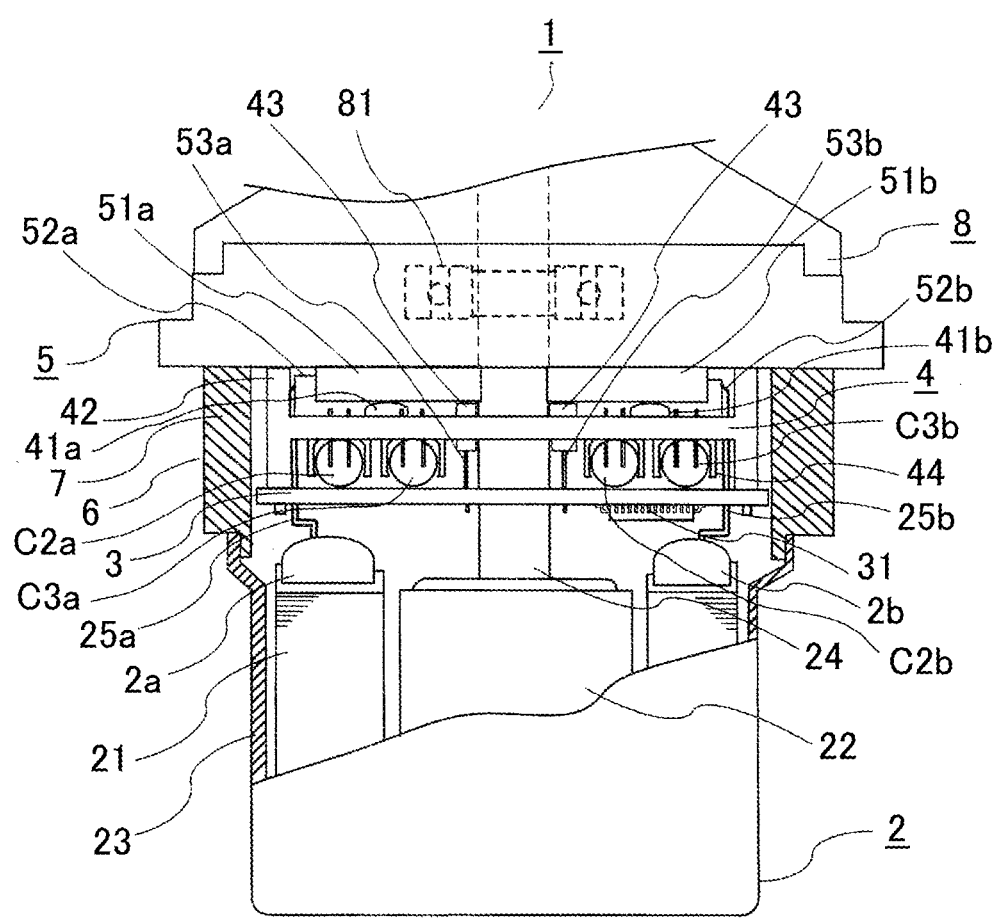
FIG. 8 is a partially cross-sectional diagram illustrating an electric power steering apparatus according to Embodiment 4 of the present invention.

Hereinafter, the explanation will be made referring to the drawings for an electric power steering apparatus according to Embodiment 4 of the present invention. FIG. 8 is a partially cross-sectional diagram illustrating the electric power steering apparatus according to Embodiment 4 of the present invention. In FIG. 8, the electric power steering apparatus 1 is constituted of the motor 2 for assisting in mainly driver's steering force, the heat sink 5 for cooling the first and second power modules 51a and 51b as will be described later, the control device 6 that controls the motor 2, and the gear portion 8 for reducing an output of the motor 2 and transmitting the reduced output to a steering shaft (not shown in the figure). The motor 2, the control device 6, the heat sink 5 and the gear portion 8 are sequentially placed side by side in a direction in which the axial center of the motor 2 extends (hereinafter referred to as an "axial direction"), and integrated.

The motor 2 is constituted of the stator 21 including a laminated core on which the first stator winding 2a formed in a three-phase delta connection and the second stator winding 2b formed in a three-phase delta connection are wound around, the rotor 22 inserted in a central space of the stator 21, the output shaft 24 disposed in a center portion of the rotor 22, the yoke 23 for housing thereinside the stator 21, the rotor 22 and the output shaft 24. The first and second stator windings 2a and 2b form two stator windings that are independent of each other. The first stator winding 2a and the first inverter circuit 511a as a first driving circuit as will be described later constitutes a first control system of the motor 2, and the second stator winding 2b and the second inverter circuit 511b as a second driving circuit as will be described later constitutes a second control system of the motor 2.

The control device 6 is constituted of the control board 3 mounting the microcomputer (hereinafter referred to as the "CPU") 31 thereon, the first power module 51a and the second power module 51b that are the two independent power modules touching to the heat sink 5, the intermediate member 4 intervening between the heat sink 5 and the control board 3 so that they oppose to each other by means of a predetermined interspace therebetween, and the housing 7 for accommodating the control board 3, the first and second power modules 51a and 51b, and the intermediate member 4 thereinside.

The first and second power modules 51a and 51b described above are formed approximately in the shapes of sectors or fans for example, and an extending direction of a maximum outer dimension of the power modules, namely, the extending direction of their front surface and rear surface defining main surfaces each is perpendicularly placed with respect to the axial direction of the motor 2. An area of each of the main surfaces of the first and second power modules 51a and 51b is formed larger than an area of any one of side faces among a side face of an outer bordering portion, a side face of an inner bordering portion, and side faces of lateral bordering portions linking between the outer bordering portion and the inner bordering portion.

The winding ends 25a and 25b of the first and second stator windings 2a and 2b elongate toward the first and second power modules 51a and 51b in the axial direction of the motor 2. And then, these winding ends 25a and 25b pass through the control board 3 and, while utilizing the intermediate member 4 as guidance, are connected to winding connection terminals 52a and 52b of the first and second power modules 51a and 51b, respectively.

Note that, it may be adopted that the first and second winding ends 25a and 25b do not pass through the control board 3, but pass by the circumference of the control board 3 and, while using the intermediate member 4 as guidance, are connected to each of the connection terminals 52a and 52b of the first and second power modules 51a and 51b. In addition, it is also suitable that positions interconnecting the connection terminals 52a and 52b of the first and second power modules 51a and 51b and each of the winding ends 25a and 25b of the first and second stator windings 2a and 2b are not only in a space between the intermediate member 4 and the first and second power modules 51a and 51b illustrated in FIG. 8, but also in a space between the control board 3 and the intermediate member 4, or on the other hand, between the first and second stator windings 2a and 2b, and the control board 3; those interconnections can be implemented by elongating each of the connection terminals 52a and 52b, and each of the winding ends 25a and 25b to the positions of those spaces, and, considering assembling capability of the electric power steering apparatus 1, those interconnection positions can be arbitrarily selected.

The CPU 31 in the control device 6 calculates control values appropriate to the electric currents to be supplied to the motor 2, and outputs control signals based on the calculated result. The control signals outputted from the CPU 31 are transmitted to the first and second power modules 51a and 51b byway of the first control terminals 53a and the second control terminals 53b, respectively. In addition, as this will be described later, it is so configured that terminal voltages, currents and the like of the motor 2 are transmitted from the first and second power modules 51a and 51b to the CPU 31 by way of each of the control terminals 53a and 53b, and those are monitored in the CPU 31.

The heat sink 5 is placed, with respect to the motor, in its axial direction, and at the same time, includes flat surfaces that perpendicularly extend with respect to the axial direction of the motor. On a side of one end-face (upper end-face of FIG. 8) of the heat sink 5 in the axial direction, the gear portion 8 that transmits assist torque from the motor 2 to the steering wheel or tires is fixed to bring into close contact with the heat sink; on a flat surface of the heat sink on a side of the other end-face (lower end-face of FIG. 8) in the axial direction, main surfaces of the first and second power modules 51a and 51b are fixed to bring into close contact with the heat sink.

Heat produced by the operations of the first and second power modules 51a and 51b is dissipated through the heat sink 5, and at the same time, transferred by way of the heat sink 5 also to the gear portion 8 and then dissipated as heat. For this reason, it is desirable that the heat sink 5 is made of a material having better heat dissipation properties, for example, of aluminum. In a central portion of the heat sink 5, the bearing 81 is fixed. The bearing 81 supports the output shaft 24 of the motor 2 to be rotationally movable, and at the same time, serves a role of positioning the axial center of the output shaft 24.

On the intermediate member 4, the first protrusions 41a and the second protrusions 41b for pressing the first and second power modules 51a and 51b into close contact with the heat sink 5 are provided corresponding to the first and second power modules 51a and 51b, respectively. These first and second protrusions 41a and 41b bring the first and second power modules 51a and 51b into close contact with the heat sink 5 by pressing the first and second power modules 51a and 51b toward a side of the heat sink 5.

Figure 9:
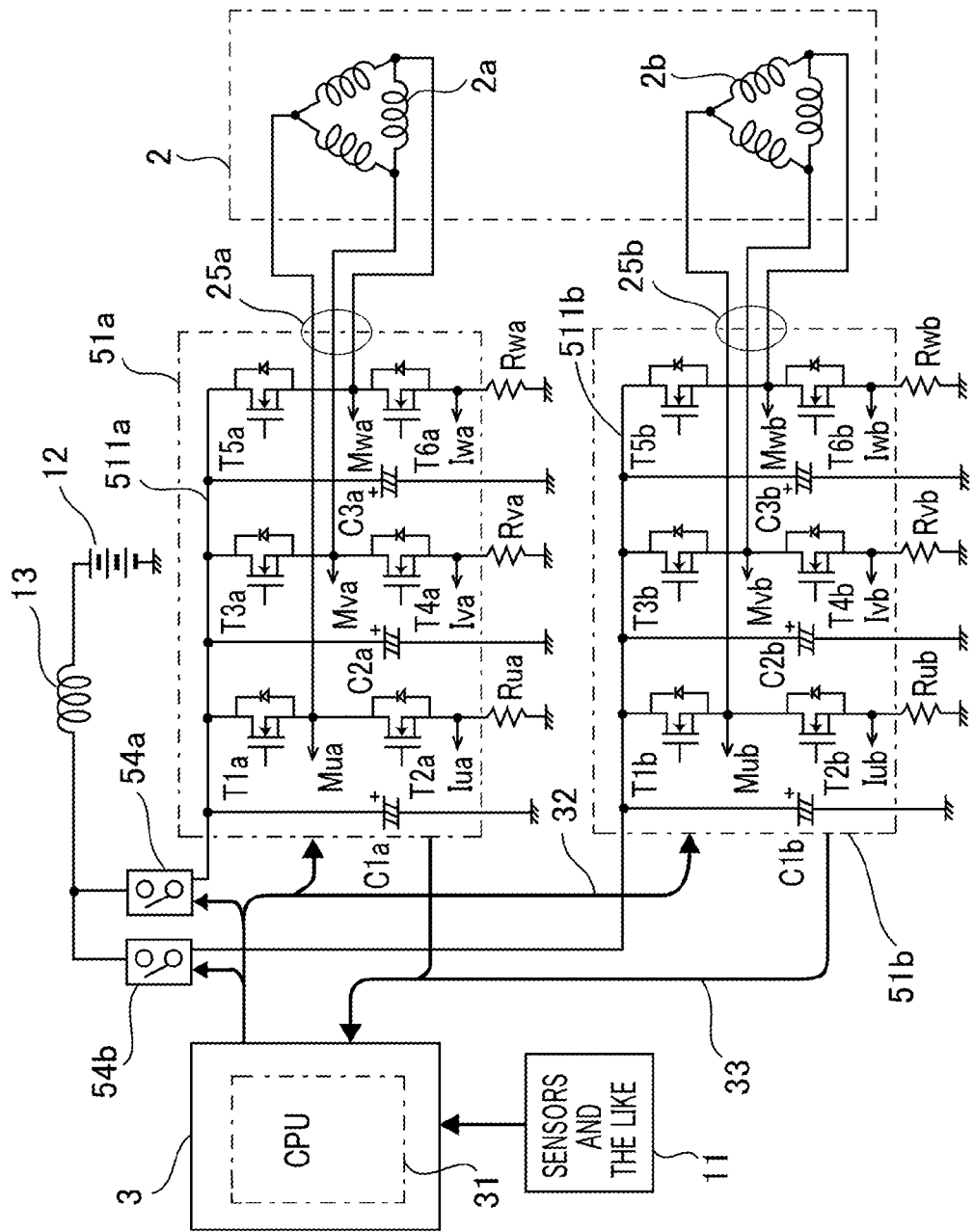
FIG. 9 is a diagram illustrating a circuit configuration of the electric power steering apparatus according to Embodiment 4 of the present invention.

Next, the explanation will be made for the electric power steering apparatus according to Embodiment 4 of the present invention from an electrical circuitry point of view. FIG. 9 is a diagram illustrating a circuit configuration of the electric power steering apparatus according to Embodiment 4 of the present invention. In FIG. 9, the electric power steering apparatus 1 according to Embodiment 4 of the present invention includes the motor 2 for producing driving force to assist in driver's steering force, the first inverter circuit 511a as the first driving circuit, the second inverter circuit 511b as the second driving circuit, the CPU 31 mounted on the control board 3, the battery 12 as a power source that is mounted on a wheeled vehicle, the first relay 54a made of field-effect transistors (hereinafter referred to as "FETs") for controlling electric power supply from the battery 12 to the first inverter circuit 511a, the second relay 54b made of FETs for controlling electric power supply from the battery 12 to the second inverter circuit 511b, and sensors and the like 11 for detecting driver's steering torque, a vehicle speed, and the like. Symbols "25a" and "25b" are the winding ends of the first and second stator windings 2a and 2b described in FIG. 8.

The first inverter circuit 511a is built in the first power module 51a, and is constituted of the switching devices T1a, T2a, T3a, T4a, T5a and T6a as six power devices made of FETs, the three shunt resistors Rua, Rva and Rwa, and three smoothing capacitors C1a, C2a and C3a. Among the six switching devices, the switching devices T1a, T3a and T5a are inserted in a phase-U upper arm, a phase-V upper arm and a phase-W upper arm of a three-phase bridge circuit, respectively, and the switching devices T2a, T4a and T6a are inserted in a phase-U lower arm, a phase-V lower arm and a phase-W lower arm of the three-phase bridge circuit, respectively.

The shunt resistors Rua, Rva and Rwa provided for detecting motor currents as will be described later are connected between the switching devices T2a, T4a and T6a, respectively, and to a ground level of a wheeled vehicle. The smoothing capacitors C1a, C2a and C3a connected between a common connecting portion of the switching devices T1a, T3a and T5a, and the ground level of the wheeled vehicle is provided for smoothing a power-source voltage supplied to the first inverter circuit 511a.

A phase-U alternating-current (AC) terminal that is a series connecting portion between the switching device T1a and the switching device T2a is connected to a phase-U terminal of the first stator winding 2a of the motor 2; a phase-V AC terminal that is a series connecting portion between the switching device T3a and the switching device T4a, connected to a phase-V terminal of the first stator winding 2a; and a phase-W AC terminal that is a series connecting portion between the switching device T5a and the switching device T6a, connected to a phase-W terminal of the first stator winding 2a.

Each end of upper arms in each phase of a three-phase bridge circuit configured to include the respective switching devices T1a, T3a and T5a is mutually connected in common to form a positive electrode-side DC terminal of the first inverter circuit 511a, and is connected to a positive electrode-side terminal of the battery 12 by way of the first relay 54a and a choke coil 13 for preventing noise from being outputted to other devices. Meanwhile, each end of lower arms in each phase of the three-phase bridge circuit configured to include the respective switching devices T2a, T4a and T6a forms negative electrode-side DC terminals of the first inverter circuit 511a, and is connected to the ground level of the vehicle through the shunt resistors Rua, Rva and Rwa, respectively.

The second inverter circuit 511b is built in the second power module 51b, and is constituted of the switching devices T1b, T2b, T3b, T4b, T5b and T6b as six power devices made of FETs, the three shunt resistors Rub, Rvb and Rwb, and three smoothing capacitors C1b, C2b and C3b. Among the six switching devices, the switching devices T1b, T3b and T5b are inserted in a phase-U upper arm, a phase-V upper arm and a phase-W upper arm of a three-phase bridge circuit, respectively, and the switching devices T2b, T4b and T6b are inserted in a phase-U lower arm, a phase-V lower arm and a phase-W lower arm of the three-phase bridge circuit, respectively.

The shunt resistors Rub, Rvb and Rwb provided for detecting motor currents are connected between the switching devices T2b, T4b and T6b, respectively, and to the ground level of the vehicle. The smoothing capacitors C1b, C2b and C3b connected between a common connecting portion of the switching devices T1b, T3b and T5b, and the ground level of the vehicle are provided for smoothing a power-source voltage supplied to the second inverter circuit 511b.

A phase-U AC terminal that is a series connecting portion between the switching device T1b and the switching device T2b is connected to a phase-U terminal of the second stator winding 2b of the motor 2; a phase-V AC terminal that is a series connecting portion between the switching device T3b and the switching device T4b is connected to a phase-V terminal of the second stator winding 2b; and a phase-W AC terminal that is a series connecting portion between the switching device T5b and the switching device T6b is connected to a phase-W terminal of the second stator winding 2b.

Each end of upper arms in each phase of a three-phase bridge circuit configured to include the respective switching devices T1b, T3b and T5b is mutually connected in common to form a positive electrode-side DC terminal of the second inverter circuit 511b, and is connected to the positive electrode-side terminal of the battery 12 by way of the second relay 54b and the choke coil 13. Meanwhile, each end of lower arms in each phase of the three-phase bridge circuit configured to include the respective switching devices T2b, T4b and T6b forms negative electrode-side DC terminals of the second inverter circuit 511b, and is connected to the ground level of the vehicle through the shunt resistors Rub, Rvb and Rwb, respectively.

The CPU 31 mounted on the control board 3 calculates control values corresponding to target current values to drive the motor 2 using information from the sensors and the like 11 mounted on the wheeled vehicle, and gives the calculated control values to the gates of each of the switching devices of the first and second inverter circuits 511a and 511b by way of the signal lines 32, so that these switching devices are subjected to PWM controls.

The motor 2 is driven by three-phase AC power that is subjected to the PWM controls by the first inverter circuit 511a and the second inverter circuit 511b, and produces desired assist torque that is added to a steering shaft (not shown in the figures) by way of the gear portion 8 described above. The target current control-values calculated by the CPU 31 are distributed between the first inverter circuit 511a and the second inverter circuit 511b, so that the quantities of electric currents are shared by the first stator winding 2a and the second stator winding 2b. This sharing ratio can be arbitrarily set.

A phase-U terminal voltage Mua, a phase-V terminal voltage Mva and a phase-W terminal voltage Mwa of the first stator winding 2a derived from a phase-U AC terminal, a phase-V AC terminal and a phase-W AC terminal of the first inverter circuit 511a are inputted into the CPU 31 by way of the signal lines 33, respectively. In addition, a phase-U motor current Iua, a phase-V motor current Iva and a phase-W motor current Iwa that flow in the first stator winding 2a are derived from the connecting portions between each of the shunt resistors Rua, Rva and Rwa, and each of the switching devices T2a, T4a and T6a of the first inverter circuit 511a, and are inputted into the CPU 31 by way of the signal lines 33, respectively.

Similarly, a phase-U terminal voltage Mub, a phase-V terminal voltage Mvb and a phase-W terminal voltage Mwb of the second stator winding 2b derived from a phase-U AC terminal, a phase-V AC terminal and a phase-W AC terminal of the second inverter circuit 511b are inputted into the CPU 31 by way of the signal lines 33, respectively. In addition, a phase-U motor current Iub, a phase-V motor current Ivb and a phase-W motor current Iwb that flow in the second stator winding 2b are derived from the connecting portions between each of the shunt resistors Rub, Rvb and Rwb, and each of the switching devices T2b, T4b and T6b of the second inverter circuit 511b, and are inputted into the CPU 31 by way of the signal lines 33, respectively.

In the electric power steering apparatus configured as described above according to Embodiment 4 of the present invention, the quantities of electric currents of the first stator winding 2a and the second stator winding 2b are controlled based on an output from the CPU 31, for example, in accordance with predetermined sharing values, so that desired assist torque is produced on the motor 2. Namely, the CPU 31 calculates target current control-values of the motor 2 based on information of driver's steering torque, a vehicle speed and the like inputted from the sensors and the like 11 as described above, and supplies gate signals corresponding to the aforementioned sharing values in response to the calculated target current control-values to the gates of each of the switching devices of the first inverter circuit 511a by way of the signal lines 32, so that the switching devices thereof are subjected to a PWM control. Similarly, the CPU supplies gate signals corresponding to the aforementioned sharing values in response to the calculated target current control-values described above to the gates of each of the switching devices of the second inverter circuit 511b by way of the signal lines 32, so that the switching devices thereof are subjected to a PWM control.

The motor 2 driven as described above produces assist torque corresponding to driver's steering torque and a vehicle speed, and adds the torque from the output shaft 24 to a steering shaft by way of the gear portion 8.

Note that, it is also possible to operate that open/close control of the first and second relays 54a and 54b is performed by instructions from the CPU 31, and that either the first inverter circuit 511a or the second inverter circuit 511b may be only selected to drive the motor 2, so that the other system is put into a resting state.

Figure 10:
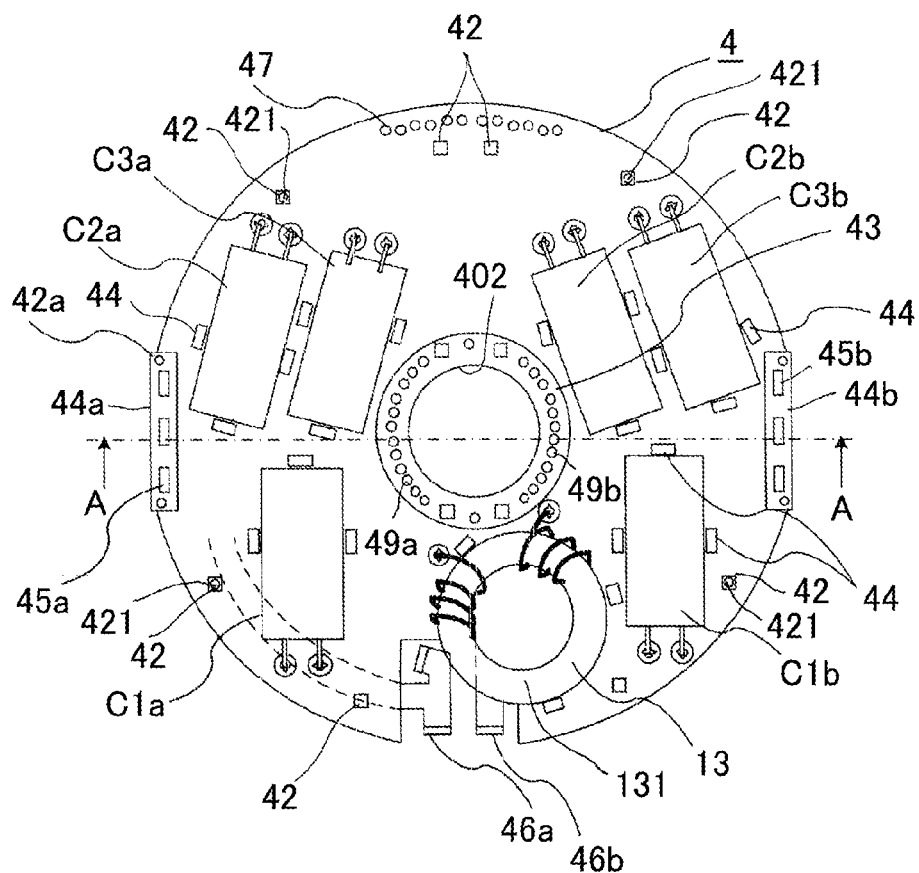
FIG. 10 is a plan view of an intermediate member in the electric power steering apparatus according to Embodiment 4 of the present invention.
Figure 11:
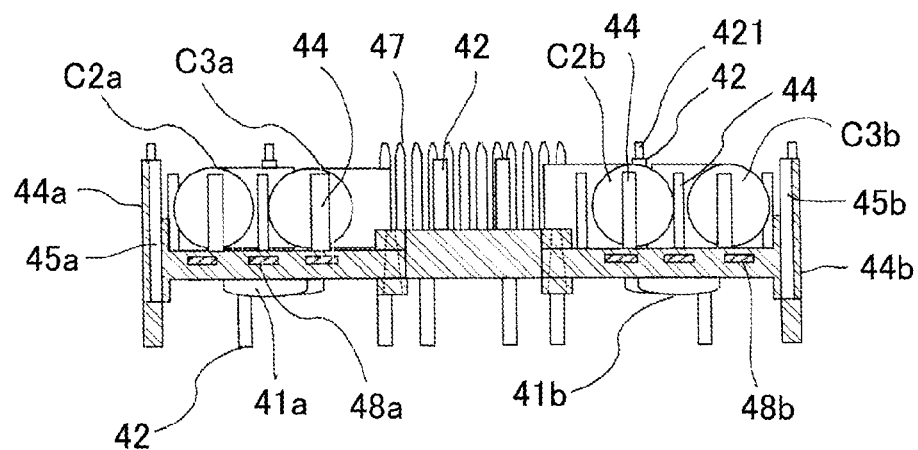
FIG. 11 is a cross-sectional diagram taken along the line A-A of FIG. 10 and viewed in the directions of the arrows.

Next, the explanation will be made for the intermediate member 4. FIG. 10 is a plan view of the intermediate member in the electric power steering apparatus according to Embodiment 4 of the present invention, and FIG. 11 is a cross-sectional diagram taken along the line A-A of FIG. 10 and viewed in the directions of the arrows. In FIG. 8, FIG.

10 and FIG. 11, the intermediate member 4 is formed approximately in a circular shape as suitably shown in FIG. 10, and is made of an electrical insulation resin in its entirety.

The first and second protrusions 41a and 41b described above are provided on the plurality of protrusions basis; the first and second protrusions 41a and 41b are provided for mutually intervening interspaces with respect to the first and second power modules 51a and 51b, respectively. On surface portions of both sides corresponding to both end-faces of the intermediate member 4 in the axial direction, the plurality of leg portions 42 is provided each protruding in the axial direction. Among these leg portions 42, cylindrical portions 421 extending in the axial direction are further formed on the four leg portions 42 provided on a surface portion in the intermediate member 4 on a side of the control board 3, and these cylindrical portions 421 are inserted into holes provided in the control board 3, so that positioning of the control board 3 and its supporting are performed.

In the intermediate member 4, the plurality of first conductor portions 48a to be connected to the first power module 51a, and the plurality of second conductor portions 48b to be connected to the second power module 51b are buried. The plurality of first conductor portions 48a buried in the intermediate member 4 is partially exposed from cutout parts of the intermediate member 4 to become the plurality of first power-source terminals 46a to be connected to the first power module 51a. Similarly, the plurality of second conductor portions 48b buried in the intermediate member 4 is partially exposed in part from cutout parts of the intermediate member 4 to become the plurality of second power-source terminals 46b to be connected to the second power module 51b. The plurality of first conductor portions 48a, and the plurality of second conductor portions 48b buried in the intermediate member 4 become power-source lines connected to a power source such as a battery or the like, and ground lines connected to the ground level of the vehicle, respectively.

A central hole 402 made in a middle portion of the intermediate member 4 is passed through by the output shaft 24 of the motor 2, and a guiding portion 43 is formed in the surroundings of the central hole 402. In this guiding portion 43, the first and second small holes 49a and 49b passing through in the axial direction are provided on the plurality of holes basis. Into these small holes 49a and 49b, conductor pins from the first and second power modules 51a and 51b are inserted. In addition, the first and second screen-shaped guides 44a and 44b as guiding portions including the plurality of rectangular holes 45a and 45b through which the winding ends 25a and 25b pass are provided at both end-edge portions of the intermediate member 4, respectively. The rectangularly shaped holes 45a and 45b described above are made on a set of three basis, and it is so configured that, by passing each of the winding ends 25a and 25b through these rectangular holes 45a and 45b, guidance and positioning are performed for the winding ends 25a and 25b.

Moreover, in a portion of the intermediate member 4, the plurality of conductor pins 47 that leads electric wiring, for example, sensor signals, and power-source and ground lines from the vehicle, is provided so that the pins protrude in the axial direction.

The smoothing capacitors C2a and C3a of the first inverter circuit 511a described above are placed side by side on the intermediate member 4 at the left upper portion of FIG. 10 with respect to a center portion of the intermediate member 4, and are mounted thereon; the smoothing capacitor C1a is placed on the intermediate member 4 at the left lower portion of FIG. 10 with respect to the center portion of the intermediate member 4, and is mounted thereon. The smoothing capacitors C2b and C3b of the second inverter circuit 511b are placed side by side on the intermediate member 4 at the right upper portion of FIG. 10 with respect to the center portion of the intermediate member 4, and are mounted thereon; at the same time, the smoothing capacitor C1b is placed on the intermediate member 4 at the right lower portion of FIG. 10 with respect to the center portion of the intermediate member 4, and is mounted thereon.

The choke coil 13 is made by winding a conductor around on a circumferential face of an annular core 131 (winding is partially shown in FIG. 10), and is mounted at a lower portion of FIG. 10 with respect to the center portion of the intermediate member 4.

In addition, from the choke coil 13, and the smoothing capacitors C1a, C2a, C3a, C1b, C2b and C3b, respective lead wires are elongated. These lead wires are bent and inserted into holes made in the intermediate member 4, and electrically connected to the first and second conductor portions 48a and 48b that are exposed from those holes.

As it is clear from FIG. 8, FIG. 10 and FIG. 11, each of the smoothing capacitors C1a, C2a, C3a, C1b, C2b and C3b, and the choke coil 13 are mounted on a surface portion of the intermediate member 4 on a side opposite to the heat sink, so that influence of heat produced by the first and second power modules 51a and 51b fixed on the heat sink 5 is difficult to be exerted as this will be described later, thermally advantageous placement is achieved.

The choke coil 13 is placed in the vicinity of the first and second power-source terminals 46a and 46b due to a relationship to the placement position on circuitry. Meanwhile, each of the smoothing capacitors is placed in a manner separated for every one of the first and second inverter circuits 511a and 511b to which the capacitors belong, and also the smoothing capacitors of phase-U, phase-V and phase-W are individually placed in a spaced manner.

Note that, an arrangement or placement in which the smoothing capacitors of each of the systems are symmetrically placed in approximately similar configurations is referred to as "equal placement" of the smoothing capacitors; however, the equal placement is not only limited to be symmetric with respect to a line of the intermediate member 4 and/or symmetric with respect to a point thereof, it is needless to say that other equal placement may be adopted accordingly.

As shown in FIG. 11, on a surface portion of the intermediate member 4 on the side opposite to the heat sink, a large number of support guides 44 are provided so as to extend in the axial direction for fixing each of the smoothing capacitors C1a, C2a, C3a, C1b, C2b and C3b, and the choke coil 13 that are large components. Each of the smoothing capacitors C1a, C2a, C3a, C1b, C2b and C3b, and the choke coil 13 are placed being gripped in between these support guides 44, so that their fixing and positioning are achieved.

Note that, it may be adopted that, by taking on three smoothing capacitors as one set, the smoothing capacitors take in different placement configurations other than the aforementioned placement configuration. Moreover, if the smoothing capacitors are made smaller in their sizes, their placement methods may exist in a limitless number; however, it is desirable that the smoothing capacitors belonging to the first inverter circuit 511a, and the smoothing capacitors belonging to the second inverter circuit 511b perform the equal placements. For example, by performing symmetrical placement centering the output shaft 24, or symmetrical placement with respect to the center of the intermediate member 4, desirable placement is achieved from a viewpoint of the center of gravity and also a viewpoint of easiness on wiring and interconnects.

In addition, although heat produced by the smoothing capacitors C1a, C2a, C3a, C1b, C2b and C3b, and the choke coil 13 is less in comparison with that by the first and second power modules 51a and 51b, the heat is produced as is the case again, so that it is desirable to equally place those respective capacitors and coil at positions spaced from the heat sink 5. As shown in FIG. 10 and FIG. 11, the smoothing capacitors C1a, C2a, C3a, C1b, C2b and C3b, and the choke coil 13 are placed onto the surface of the intermediate member 4 approximately perpendicularly with respect to the axial direction of the motor 2 (hereinafter this arrangement or placement is referred to as a "horizontal placement"); therefore, the dimension of height of each of the smoothing capacitors and the choke coil protruding in the axial direction on the intermediate member 4 can be made smaller, and also the distance between the first and second power modules 51a and 51b, and the control board 3 can be made shorter. To be specific, it is better to place the smoothing capacitors C1a, C2a, C3a, C1b, C2b and C3b, and the choke coil 13 to direct, among their vertical and horizontal dimensions, smaller ones in the axial direction.

Moreover, the smoothing capacitors and the choke coil being electric devices are placed between the intermediate member 4 and the control board 3 as described above; however, it may be adopted that all of the smoothing capacitors and the choke coil are placed between the intermediate member 4 and the heat sink 5. But, in this case, it is desirable that, considering heat produced by each of the power modules 51a and 51b, the smoothing capacitors and the choke coil are placed so as to provide appropriate spaces therebetween. While on the other hand, it is also possible to adopt distributed placement in which part of the smoothing capacitors and the choke coil are placed between the intermediate member 4 and the control board 3, and the remaining smoothing capacitors are placed between the intermediate member 4 and the heat sink 5.

Because each of the shunt resistors Rua, Rva, Rwa, Rub, Rvb and Rwb has a smaller dimension of its height, namely, a smaller maximum outer dimension than the dimension of height of the smoothing capacitors and the choke coil, namely, the maximum outer dimension thereof, it may be adopted that, well considering wiring and interconnects, the shunt resistors are mounted on either one of the surfaces of the intermediate member 4. In addition, it is possible from a controllability viewpoint to arrange that the shunt resistors are not for one resistor per phase, but are two resistors in total for collective phases, or on a set of two resistors basis by eliminating for only one phase.

Next, the explanation will be made for an arrangement or placement of the first and second power modules 51a and 51b or the like building therein the aforementioned switching devices that are power devices producing a large amount of heat liberated thereby. FIG. 8 shows a state in which the first and second power modules 51a and 51b are fixed to bring into close contact with the heat sink 5 on its flat surface on a side of the other end-face (lower end-face of FIG. 8) described above.

On the heat sink 5, the first and second relays 54a and 54b described above are mounted, in addition to the first and second power modules 51a and 51b; however, the relays are not illustrated in FIG. 8. The first and second power modules 51a and 51b, and the first and second relays 54a and 54b produce a large amount of heat liberated thereby due to large currents that flow therethrough; the large currents cannot be flown therethrough without enhancing heat dissipation effects. The entirety of the control device 6 is placed at an upper portion of the motor 2 in FIG. 8, and each of the components constituting the control device 6 is integrally fixed on the motor 2; moreover, the heat sink 5 formed approximately in a circular shape is fixed on the housing 7 of the control device 6.

The first power module 51a and the second power module 51b are placed on the flat surface of the heat sink 5 approximately in the entirety of the surface, equally on both sides sandwiching the center therebetween. And then, in order to achieve larger contact areas with the heat sink 5, the first and second power modules 51a and 51b each are formed approximately in the shapes of sectors or fans to suit along the outside shape of the heat sink 5. The first and second relays 54a and 54b each serving as electronic relays having been molded in rectangle shapes, or approximately in the shapes of sectors or fans using a resin mold material are placed between the first and second power modules 51a and 51b each formed approximately in the shapes of sectors or fans, and are fixed to bring into close contact with the flat surface on a side of the other end-face (lower end-face of FIG. 8) of the heat sink 5.

Note that, the explanation is made for a case in which each of the first and second power modules 51a and 51b is formed by building the switching devices T1a through T6a, and T1b through T6b made of FETs in one package on a set of six devices per module basis, respectively; however, the case is not limited to this, but it is possible to implement various types for the circuits built in the power modules.

As illustrated in FIG. 8, the control device 6 is placed in the axial direction of the motor 2 between the motor 2 and the gear portion 8, and the output shaft 24 of the motor 2 passes through in the center of the control device 6. An order of assembly of the electric power steering apparatus 1 structured as described above proceeds with the order in that, first, the intermediate member 4 and the first and second power modules 51a and 51b are overlaid with each other; moreover, the control board 3 is stacked thereon, and the control device 6 is assembled; after having combined the control device 6 in the axial direction of a shaft center of the motor 2, the housing 7 and the heat sink 5 are assembled; and finally, the gear portion 8 is integrated.

While on the other hand, as another order of assembly, it is also possible to arrange that, first, the control board 3, the intermediate member 4 and the first and second power modules 51a and 51b are sequentially stacked upon the motor 2; next, the housing 7 and the heat sink 5 are attached thereto; and finally, the gear portion 8 is assembled. Moreover, when the housing 7 is divided into a plurality of pieces, it may be adopted that the first and second power modules 51a and 51b are mounted in an upper portion of the heat sink 5 (the case in FIG. 8 is in a lower portion of the heat sink); next, the intermediate member 4 and the control board 3 are assembled altogether, and connected to the motor 2; and afterward, the housing 7 and the gear portion 8 are assembled.

As described above, the control device 6 is made as a layered structure of the heat sink 5, the first and second power modules 51a and 51b, the intermediate member 4, and the control board 3; each of the power modules 51a and 51b that produces the largest amount of heat liberated thereby is brought into close contact with the heat sink 5. Therefore, heat produced by each of the power modules 51a and 51b can be heat-transferred from the heat sink 5 to the side of the gear portion 8, resulting in excellent dissipation properties of produced heat. In addition, the smoothing capacitors and the choke coil being comparatively large electric devices are placed on the intermediate member 4, and spaces are provided among those devices, so that an effect can be achieved in that dissipation properties of produced heat are enhanced, and each of the subassemblies can be sequentially assembled as described above, resulting in also enhancement of assembling capability.

Note that, the aforementioned explanation is made to show a case in which the control device 6 is mounted on a front side that is an output side of the motor 2; however, it may be adopted that the control device 6 is mounted on a side opposite to the front side of the motor 2, namely, on the rear side of the motor 2; whereas, it is not necessary to make holes for the use by the output shaft of the motor in the heat sink, the intermediate member, and the control board according to this embodiment, so that an area of each of the components can be effectively utilized, resulting in a wider degree of freedom also for the placement of electric devices as large components. Note that, also in a case of this embodiment, electric devices of smoothing capacitors and the like perform the equal placement in the manner of horizontal placement on the intermediate member similarly to the manners described above.

As described above, according to the electric power steering apparatus in Embodiment 4 of the present invention, even when the control device is placed on either the front side or the rear side of the motor, it is possible to achieve, by observing the horizontal placement where electric devices that are large components of smoothing capacitors and the like are placed on the intermediate member spaced from the power modules, a shorter length in the direction of the output shaft, and consequently, miniaturization of the apparatus.

Embodiment 5

Figure 12:
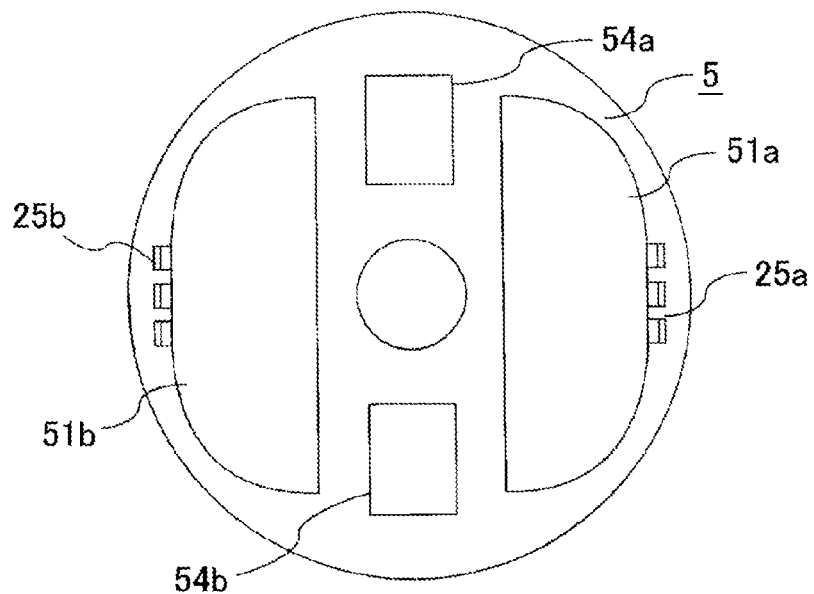
FIG. 12 is a plan view of a heat sink in an electric power steering apparatus according to Embodiment 5 of the present invention.

Next, the explanation will be made for an electric power steering apparatus according to Embodiment 5 of the present invention. FIG. 12 is a plan view of a heat sink in the electric power steering apparatus according to Embodiment 5 of the present invention. In FIG. 12, the first and second power modules 51a and 51b are symmetrically placed equally to the right and left of the figure from the center of the heat sink 5 that is in a circular shape.

In addition, the first and second relays 54a and 54b are placed on the heat sink 5 between the first and second power modules 51a and 51b. Note that, here, the power modules 51a and 51b each are shown as two components; however, it may be adopted that one inverter circuit is constituted of a large number, for example, three or more power modules; even in that case, those power modules each are equally placed in a spaced manner for each of the systems in the ranges of positions of the first and second power modules 51a and 51b of FIG. 12.

Figure 13:
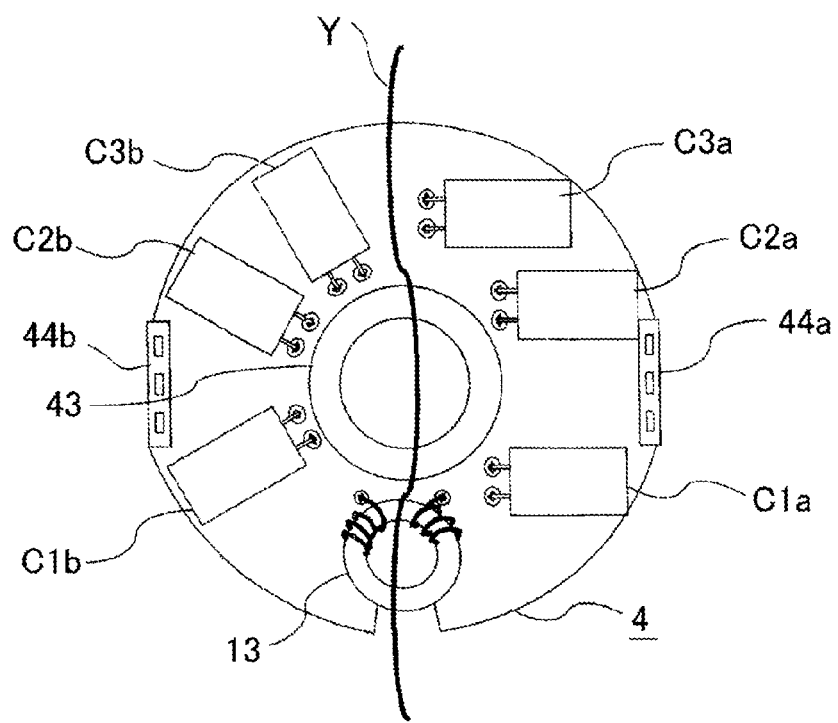
FIG. 13 is a plan view of an intermediate member in the electric power steering apparatus according to Embodiment 5 of the present invention.

FIG. 13 is a plan view of an intermediate member in the electric power steering apparatus according to Embodiment 5 of the present invention; the placement of the first and second power modules 51a and 51b in the heat sink 5 shows the intermediate member used in a case of the placement shown in FIG. 12 described above. In addition, the placements of smoothing capacitors and a choke coil as electric devices shown in FIG. 13 differ at the left side and the right side of the solid line "Y" from each other.

In FIG. 13, the choke coil 13 is placed at distanced positions from the first and second screen-shaped guides 44a and 44b provided at two places in outer bordering portions of the intermediate member 4. Opposing to a surface portion on an opposite side of the intermediate member 4 corresponding to the positions where the first and second screen-shaped guides 44a and 44b are provided, the first and second power modules 51a and 51b are placed on a flat surface of the heat sink 5 as shown in FIG. 12; and therefore, the smoothing capacitors C1a, C2a and C3a, and C1b, C2b and C3b are placed to oppose the neighborhood of the places of the first and second power modules 51a and 51b, in such a manner at the right side or the left side of the solid line "Y" in FIG. 13, being placed in a spaced manner for every one of the systems.

When the placement at the left side of the solid line "Y" in FIG. 13 is adopted, the smoothing capacitors C1a, C2a and C3a, and C1b, C2b and C3b each are placed in the manner according to the horizontal placement, and also radially with respect to the center portion of the intermediate member. When the placement at the right side of the solid line "Y" in FIG. 13 is adopted, the smoothing capacitors C1a, C2a and C3a, and C1b, C2b and C3b each are placed in the manner according to the horizontal placement, and also in parallel in the horizontal direction of FIG. 13.

As described above, corresponding to the placement positions of the first and second power modules 51a and 51b, the smoothing capacitors C1a, C2a and C3a, and C1b, C2b and C3b perform on a set of three basis the equal placement for every one of the systems, and moreover, the smoothing capacitors are mutually placed in a spaced manner. The choke coil 13 that is the other electric device is placed between the smoothing capacitors C1a, C2a and C3a, and the smoothing capacitors C1b, C2b and C3b as shown in FIG. 13. In either placement on the right or left of the solid line "Y," the choke coil 13, the smoothing capacitors C1a, C2a and C3a, and the smoothing capacitors C1b, C2b and C3b perform the equal placement on the intermediate member 4.

Note that, other constituent items and things are equivalent or similar to those in Embodiment 4.

As described above, according to the electric power steering apparatus in Embodiment 5 of the present invention, each of the power modules is placed while spacing with respect to the stator windings; corresponding to this, the smoothing capacitors and the choke coil that are electric devices also perform the equal placement on the intermediate member spacing with one another, so that narrow spaces within the control device can be effectively utilized, and in addition, the dimension in the axial direction can be made smaller.

Note that, in the present invention, each of the embodiments can be freely combined, and/or each of the embodiments can be appropriately modified or eliminated without departing from the scope of the invention.

INDUSTRIAL APPLICABILITY

It can be expected that the electric power steering apparatus according to the present invention is substantially utilized in a field of automotive vehicle industries.

EXPLANATION OF NUMERALS AND SYMBOLS

Numeral "1" designates an electric power steering apparatus; "2," motor; "2a," first stator winding; "2b," second stator winding;
"21," stator; "22," rotor; "25a," first winding ends;

"25b," second winding ends; "3," control board; "31," CPU; "4," intermediate member; "11," sensors and the like; "41a," first protrusions; "41b," second protrusions; "42," leg portion;
"421," cylindrical portion of leg portion; "43," guiding portion; "44a," first screen-shaped guide; "44b," second screen-shaped guide; "45a," first rectangular holes; "45b," second rectangular holes;
"46a," first conductor terminals; "46b," second conductor terminals;
"47," conductor pins; "48a," first conductor portions; "48b," second conductor portions; "49a," first small holes; "49b," second small holes; "5," heat sink; "51a," first power module; "51b," second power module; "512a," "512b," outer bordering portion; "52a," "52b," winding connection terminals; "513a," "513b," inner bordering portion; "514a," "514b," lateral side portion; "501," central hole;
"56a," "56b," power-source line connection terminals; "57a," "57b," control terminals; "58," flange portion;
"55ua," "55va," "55wa," "55ub," "55vb," "55wb," resistor connection terminal;
"6," control device; "7," housing; "61a," "61b," input-side terminal;
"62a," "62b," output-side terminal; "63a," "63b," control terminal; "8," gear portion; "81," "82," bearing;
"T1a," "T2a," "T3a," "T4a," "T5a," "T6a," "T1b," "T2b," "T3b," "T4b," "T5b," "T6b," "T1," "T2," "T3," "T4," switching device;
"Rua," "Rva," "Rwa," "Rub," "Rvb," "Rwb," "R," shunt resistor;
"C1a," "C2a," "C3a," "C1b," "C2b," "C3b," smoothing capacitor;
"12," battery; "13," choke coil; "54a," first relay; "54b," second relay; and "44," support guide.

What is claimed is:

1. An electric power steering apparatus comprising:
a motor having a plurality of independent stator windings;
a control device having a plurality of driving circuits for individually driving the plurality of stator windings, the control device being configured to assist in steering force of a driver based on an output of the motor driven by the control device; and
an intermediate member being placed in the control device, and including a surface portion perpendicularly placed with respect to an axial direction of the motor, wherein
the plurality of driving circuits includes a plurality of power modules configured to house a plurality of power devices made of switching devices for controlling electric power supplied to the stator windings corresponding to the driving circuits, and a plurality of electric devices as constituent components of the driving circuits, wherein each of the electric devices has a shape defined by a plurality of outer dimensions including a maximum outer dimension which is longer than the other outer dimensions;
the electric power steering apparatus further comprises a heat sink configured to dissipate heat generated by the plurality of power modules, and
the electric power steering apparatus is configured such that either:
the plurality of power modules of the plurality of driving circuits is attached on the heat sink placed at a position spaced apart from the surface portion of the intermediate member so that a main surface of each of the power modules is perpendicular with respect to the axial direction of the motor, or
the electric devices of the driving circuits are attached on the surface portion of the intermediate member so that an extending direction of the maximum outer dimension of the respective electric devices is perpendicular with respect to the axial direction of the motor.

2. The electric power steering apparatus as set forth in claim 1, wherein
the heat sink attaching the plurality of power modules thereon is placed along the axial direction of the motor with respect to the motor, and also includes a flat surface perpendicularly extending with respect to the axial direction; and
the plurality of power modules are fixed on the flat surface of the heat sink to bring the plurality of power modules into contact with said main surface.

3. The electric power steering apparatus as set forth in claim 2, wherein
the heat sink is formed approximately in a circular shape; and
the power modules are placed approximately in a symmetrical manner with respect to a center of the heat sink, and attached on the heat sink.

4. The electric power steering apparatus as set forth in claim 2, wherein
the control device includes a control board mounting a microcomputer thereon for calculating a control value for driving the switching devices housed in the plurality of power modules;
the intermediate member is configured to electrically connect the plurality of power modules and the control board therebetween; and
the heat sink, the plurality of power modules, the intermediate member, and the control board are placed side by side in the axial direction of the motor.

5. The electric power steering apparatus as set forth in claim 4, wherein the electric devices are attached on the surface portion of the intermediate member on a side opposing the control board, or on the surface portion of the intermediate member on a side opposing the heat sink.

6. The electric power steering apparatus as set forth in claim 5, wherein
the electric devices of each of the driving circuits include at least a plurality of capacitors, and
the capacitors are separated and symmetrically placed for every one of the driving circuits to which the capacitors belong.

7. The electric power steering apparatus as set forth in claim 4, wherein the intermediate member comprises, on surfaces of both sides opposing each other, leg portions for holding an interspace between the heat sink and the intermediate member, and an interspace between the control board and the intermediate member.

8. The electric power steering apparatus as set forth in claim 4, wherein
the control device comprises a housing fixed on a yoke of the motor at an end portion of the motor in the axial direction of the motor, and
the plurality of power modules, the intermediate member, and the control board are accommodated in the housing.

9. The electric power steering apparatus as set forth in claim 4, wherein the intermediate member has a plurality of conductor portions buried therein for forming at least a power-source line and a ground line, and is configured to connect the plurality of conductor portions to power-source line connection terminals and ground-line connection terminals elongating from the plurality of power modules.

10. The electric power steering apparatus as set forth in claim 4, wherein the intermediate member comprises protrusions for pressing the plurality of power modules toward a side of the heat sink.

11. The electric power steering apparatus as set forth in claim 4, wherein the plurality of power modules or the electric devices are separated and symmetrically placed for every one of the driving circuits to which the plurality of power modules or the electric devices belong, respectively.

12. The electric power steering apparatus as set forth in claim 2, wherein
the control device includes relays and a coil connected between the plurality of driving circuits and a power source, and
the relays and the coil are attached on the surface portion of the intermediate member so that an extending direction of a maximum outer dimension of the relays and the coil is perpendicular with respect to the axial direction.

13. The electric power steering apparatus as set forth in claim 2, wherein
the plurality of power modules is a first plurality of power modules, and comprises a second plurality of power modules including at least two of the power devices;
the first plurality of power modules in the plurality of driving circuits is constituted of individual power modules in the second plurality of power modules; and
winding ends of the plurality of stator windings are separately elongated for every one of respective stator windings corresponding to the first plurality of power modules of the plurality of driving circuits.

14. The electric power steering apparatus as set forth in claim 13, wherein
the plurality of stator windings is made of two three-phase stator windings;
the plurality of driving circuits is made of two inverter circuits for individually driving the two three-phase stator windings;
the second plurality of power modules each houses at least six of the power devices, and is constituted of two power modules individually configuring the two inverter circuits; and
the two power modules are symmetrically placed on the heat sink.

15. The electric power steering apparatus as set forth in claim 2, further comprising
a gear portion for reducing an output of the motor, wherein
the control device is placed in the axial direction of the motor between the motor and the gear portion.

16. The electric power steering apparatus as set forth in claim 2, further comprising
a gear portion for reducing an output of the motor, wherein
the motor is placed in the axial direction of the motor between the control device and the gear portion.

* * * * *